(12) United States Patent
Lee et al.

(10) Patent No.: US 10,785,675 B2
(45) Date of Patent: Sep. 22, 2020

(54) METHOD AND DEVICE FOR CONTROLLING TRAFFIC OF ELECTRONIC DEVICE IN WIRELESS COMMUNICATION SYSTEM

(71) Applicant: Samsung Electronics Co., Ltd., Suwon-si, Gyeonggi-do (KR)

(72) Inventors: Hyung-Ho Lee, Seoul (KR); Beom-Sik Bae, Suwon-si (KR); Ji-Cheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 15/505,815

(22) PCT Filed: Sep. 11, 2015

(86) PCT No.: PCT/KR2015/009561
§ 371 (c)(1),
(2) Date: Feb. 22, 2017

(87) PCT Pub. No.: WO2016/039577
PCT Pub. Date: Mar. 17, 2016

(65) Prior Publication Data
US 2018/0220325 A1    Aug. 2, 2018

(30) Foreign Application Priority Data
Sep. 11, 2014 (KR) ........................ 10-2014-0120227

(51) Int. Cl.
*H04W 28/02* (2009.01)
*H04W 72/12* (2009.01)
(Continued)

(52) U.S. Cl.
CPC ......... *H04W 28/0268* (2013.01); *H04L 47/24* (2013.01); *H04W 28/02* (2013.01);
(Continued)

(58) Field of Classification Search
None
See application file for complete search history.

(56) References Cited

U.S. PATENT DOCUMENTS

| 2009/0059791 A1 | 3/2009 | Saxena |
| 2012/0134291 A1* | 5/2012 | Raleigh ............ G06Q 10/06375 |
| | | 370/252 |

(Continued)

FOREIGN PATENT DOCUMENTS

| CN | 102148778 A | 8/2011 |
| CN | 103238301 A | 8/2013 |

(Continued)

OTHER PUBLICATIONS

Sungsoo Cho et al., "Providing QoS and Rate Limiting for WiMAX Mobile Hotspots based on Policy and Charging Control Architecture", Aug. 30, 2013, pp. 217-226, XP055627879 (Year: 2013).*

(Continued)

*Primary Examiner* — Ayaz R Sheikh
*Assistant Examiner* — Sori A Aga
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure relates to a method and a device for controlling traffic of an electronic device in a wireless communication system, and the method can comprise the steps of: detecting a plurality of parts of traffic flows corresponding to at least one application; and preferentially processing the plurality of parts of traffic flows on the basis of application related information on each of the detected plurality of parts of traffic flows.

17 Claims, 15 Drawing Sheets

(51) Int. Cl.
*H04L 12/851* (2013.01)
*H04W 72/10* (2009.01)
*H04W 84/12* (2009.01)
*H04W 88/04* (2009.01)

(52) U.S. Cl.
CPC ........... *H04W 72/10* (2013.01); *H04W 72/12* (2013.01); *H04W 72/1236* (2013.01); *H04W 72/1242* (2013.01); *H04W 84/12* (2013.01); *H04W 88/04* (2013.01)

(56) References Cited

U.S. PATENT DOCUMENTS

| | | | |
|---|---|---|---|
| 2012/0144063 A1 | 6/2012 | Menchaca et al. | |
| 2012/0265897 A1 | 10/2012 | Das et al. | |
| 2014/0207671 A1 | 7/2014 | Eom | |
| 2015/0036672 A1 | 2/2015 | Kim et al. | |
| 2015/0358984 A1* | 12/2015 | Uchino | H04W 72/10 370/329 |
| 2017/0078922 A1* | 3/2017 | Raleigh | H04L 69/18 |

FOREIGN PATENT DOCUMENTS

| | | |
|---|---|---|
| EP | 2259509 A1 | 12/2010 |
| EP | 2 941 051 A1 | 11/2015 |
| KR | 20130098424 A | 9/2013 |
| WO | 2013141560 A1 | 9/2013 |
| WO | 2014025178 A1 | 2/2014 |
| WO | 2014/103717 A1 | 7/2014 |
| WO | 2014/104068 A1 | 7/2014 |

OTHER PUBLICATIONS

Cisco Visual Networking Index_Global Mobile Data Traffic Forecast Update, 2013-2018, Feb. 5, 2014.
IEEE Standard for Information technology, Telecommunications and information exchange between systems, Local and metropolitan area networks, Specific requirements, Part 11: Wireless LAN Medium Access Control (MAC) and Physical Layer (PHY) Specifications. IEEE Std 802.11-2012, Mar. 29, 2012.
European Search Report dated Mar. 19, 2018, issued in European Application No. 15839518.6-1215 / 3193527.
Chinese Office Action dated Aug. 26, 2019, issued in Chinese Patent Application No. 201580060685.1.
Sungsoo Cho et al., "Providing QoS and Rate Limiting for WiMAX Mobile Flotspots based on Policy and Charging Control Architecture", Aug. 30, 2013, pp. 217-226, XP055627879.
European Office Action dated Oct. 16, 2019, issued in European Patent Application No. 15839518.6-1215.

* cited by examiner

| No | SIP | DIP | SP | DP | Type | APP ID | QP | W1 | W2 |
|---|---|---|---|---|---|---|---|---|---|
| 1 | 1 | 2 | 80 | 80 | TCP | 1 | 1 | 0.4 | 0.5 |
| 2 | 1 | 22 | 123 | 123 | TCP | 1 | 4 | 1.6 | - |
| 3 | 1 | 11 | 80 | 80 | TCP | 2 | 3 | 1.2 | 1.5 |
| 4 | 2 | 2 | 80 | 80 | TCP | 1 | 2 | 0.8 | 1 |

FIG.4

METHOD AND DEVICE FOR CONTROLLING TRAFFIC OF ELECTRONIC DEVICE IN WIRELESS COMMUNICATION SYSTEM

CROSS-REFERENCE TO RELATED APPLICATION(S)

This application is a U.S. National Stage application under 35 U.S.C. § 371 of an International application filed on Sep. 11, 2015 and assigned application number PCT/KR2015/009561, which claimed the benefit of a Korean patent application filed on Sep. 11, 2014 in the Korean Intellectual Property Office and assigned Serial number 10-2014-0120227, the entire disclosure of which is hereby incorporated by reference.

TECHNICAL FIELD

The present invention relates to control traffic of an electronic device in a wireless communication device and, more particularly, to a method and an apparatus for controlling traffic of an electronic device so as to improve the quality of experience.

BACKGROUND ART

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.
In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the rapid increase in the use of electronic devices, there has been a rapidly increasing interest in various additional functions provided through the electronic devices. For example, there is a rapidly increasing interest in linking two different electronic devices so as to provide functions for enhancing the user convenience. That is, various functions are provided for enhancing the user convenience by linking an electronic device, such as a smartphone that supports a cellular mobile communication network, to an electronic device such as a notebook, a smart pad, and a wearable device that supports a short-range wireless communication function (e.g., Wi-Fi).

DETAILED DESCRIPTION OF THE INVENTION

Technical Problem

An embodiment of the present invention is to provide a method and an apparatus for enhancing the quality of experience (QoE) of a user by differentially controlling application traffic of the primary electronic device and secondary electronic device in a system where the secondary electronic device is provided with a communication service through the primary electronic device.

Another embodiment of the present invention is to provide a method and an apparatus for acquiring QoE state information per traffic corresponding to an application being executed by each of first and secondary electronic devices in a system where the secondary electronic device is provided with a communication service through the primary electronic device.

Still another embodiment of the present invention is to provide a method and an apparatus for reporting, by a secondary electronic device, QoE state information per traffic corresponding to an application being executed, to a primary electronic device, in a system where the secondary electronic device is provided with a communication service through the primary electronic device.

Still another embodiment of the present invention is to provide a method and an apparatus for differentiating each part of traffic, by a primary electronic device, based on QoE state information per traffic according to an application of the primary electronic device and QoE state information per traffic according to an application of a secondary electronic device, in a system where the secondary electronic device is provided with a communication service through the primary electronic device.

Still another embodiment of the present invention is to provide a method and an apparatus for dividing a communication period between a secondary electronic device and a server into a plurality of periods, and differentially processing traffic for each period in a system where the secondary electronic device is provided with a communication service through the primary electronic device.

Solution to Problem

According to an embodiment of the present invention, a method for controlling traffic of an electronic device may include: detecting a plurality of parts of traffic corresponding to at least one application; and differentially processing the plurality of parts of traffic on the basis of application related information for each of the detected plurality of parts of traffic.

According to an embodiment of the present invention, a method for controlling traffic of an electronic device may include: detecting at least one part of traffic corresponding to at least one application; transmitting application related information on the detected at least one part of traffic to other electronic device connected to the electronic device; receiving control information on the at least one part of traffic from the other electronic device; and processing the traffic based on the received control information.

According to an embodiment of the present invention, an apparatus for controlling traffic of an electronic device may include: a communication module which communicates with another electronic device; and a controller which detects a plurality of parts of traffic corresponding to at least one application, and differentially processes the plurality of parts of traffic on the basis of application related information for each of the detected plurality of parts of traffic.

According to an embodiment of the present invention, an apparatus for controlling traffic of an electronic device may include: a communication module which communicates with other electronic device; and a communication controller which performs control so as to detect at least one part of traffic corresponding to at least one application, transmit application related information on the at least one detected part of traffic to another electronic device connected to the electronic device, receive control information on the at least one part of traffic from the other electronic device, and process the traffic based on the received control information.

Advantageous Effects of Invention

According to the present invention, in a system where a secondary electronic device is provided with a communication service through a primary electronic device, the primary electronic device differentially processes each part of traffic on the basis of QoE state information per traffic according to an application of the primary electronic device and QoE state information per traffic according to an application of the secondary electronic device, so that a higher data transmission rate and a lower latency can be provided for an application requiring high QoE, thereby enhancing QoE of a user.

BRIEF DESCRIPTION OF THE DRAWINGS

FIG. 4 is a diagram illustrating a table as an example of determining the priority for each part of traffic according to an application in a primary electronic device according to an embodiment of the present invention;

BEST MODE FOR CARRYING OUT THE INVENTION

Figure 1:
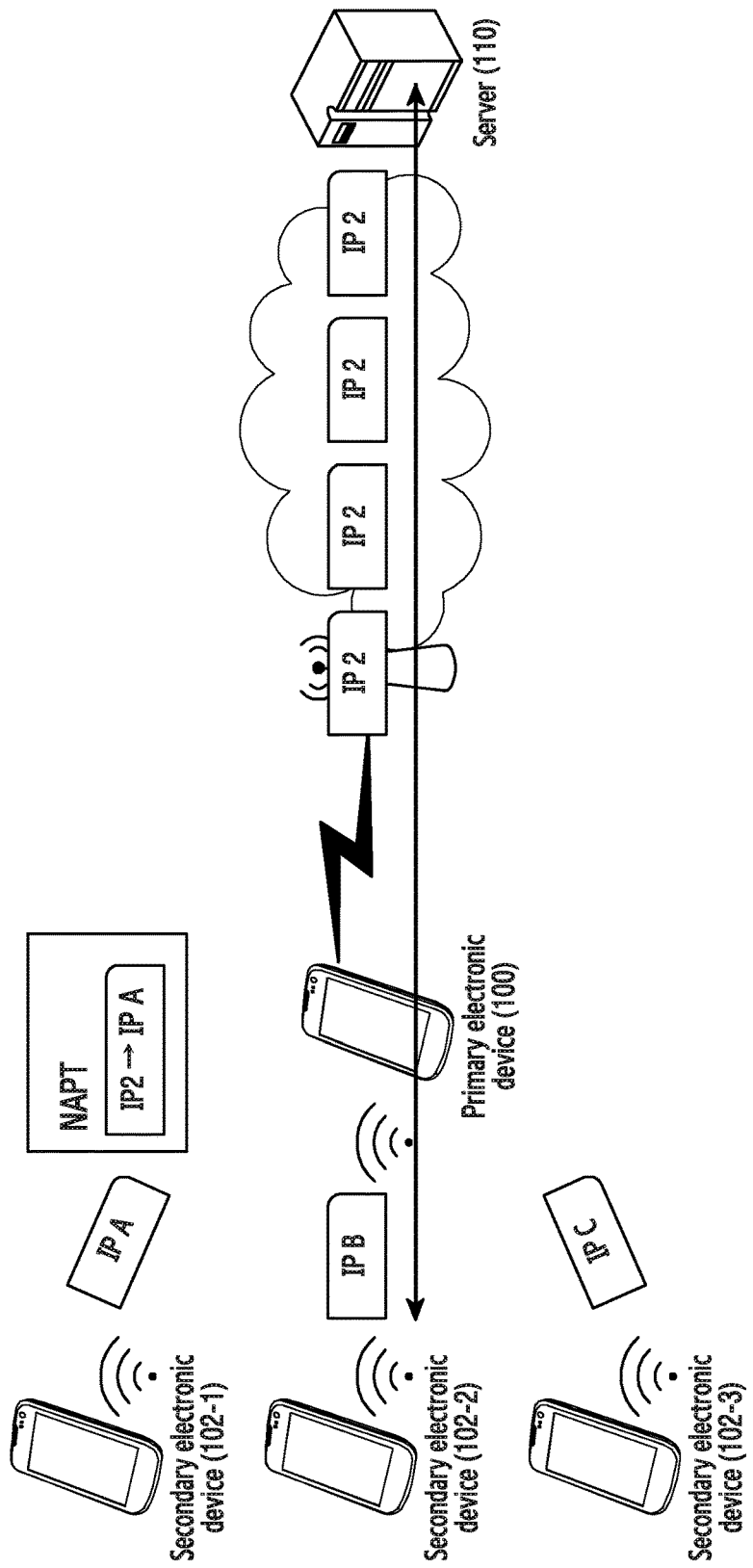
FIG. 1 is a diagram schematically illustrating a structure of a system where a secondary electronic device is provided with a communication service through a primary electronic device, to which embodiments of the present invention are applied.

Hereinafter, some embodiments of the present invention will be described with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it may make the subject matter of the present invention rather unclear.

As used in various embodiments of the present invention, the expressions "include", "may include", and other conjugates refer to the existence of a corresponding disclosed function, operation, or constituent element, and do not limit one or more additional functions, operations, or constituent elements. Further, as used in various embodiments of the present invention, the terms "include", "have", and their conjugates are intended merely to denote a certain feature, numeral, step, operation, element, component, or a combination thereof, and should not be construed to initially exclude the existence or a possibility of the addition of one or more other features, numerals, steps, operations, elements, components, or combinations thereof.

Further, as used in various embodiments of the present invention, the expression "or" includes any or all combinations of words enumerated together. For example, the expression "A or B" may include A, may include B, or may include both A and B.

While expressions including ordinal numbers, such as "first" and "second", as used in various embodiments of the present invention may modify various constituent elements, such constituent elements are not limited by the above expressions. For example, the above expressions do not limit the sequence and/or importance of the elements. The above-described expressions may be used to distinguish an element from another element. For example, a primary electronic device and a secondary electronic device indicate different electronic devices although both of them are electronic devices. For example, a first element may be termed a second element, and likewise a second element may also be termed a first element without departing from the scope of various embodiments of the present invention.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present invention are merely for the purpose of describing particular embodiments and are not intended to limit the various embodiments of the present invention. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in the present invention.

An "electronic device" as described below in embodiments of the present invention means an electronic device that is fixed or mobile. According to the embodiments, another term may be used to refer to the electronic device, for example, the electronic device may be called a mobile station (MS), a user equipment (UE), a mobile equipment (ME), a mobile terminal (MT), a user terminal (UT), a subscriber station (SS), a wireless device, a personal digital assistant (PDA), a wireless modem, or a handheld device.

An electronic device according to various embodiments of the present invention may be a device including a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller's machine (ATM) of a banking system, and a point of sales (POS) of a shop.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present invention may be a combination of one or more of the aforementioned various devices. Also, an electronic device according to various embodiments of the present invention may be a flexible device. Further, it will be apparent to those skilled in the art that the electronic device according to various embodiments of the present invention is not limited to the aforementioned devices.

In various embodiments, the term "user" may indicate a person using an electronic device or a device (e.g. an artificial intelligence electronic device) using an electronic device.

Further, in an embodiment of the present invention, the electronic device may be divided into a primary electronic device and a secondary electronic device. For example, the primary electronic device refers to an electronic device supporting a tethering, a mobile hotspot, and/or a relay function, which may access a cellular mobile communication network, and may be connected to a secondary electronic device through a short-range wireless communication technology (e.g., Wi-Fi or Bluetooth) to allow the secondary electronic device to access the cellular mobile communication network. For example, the primary electronic device may operate as an Access Point (AP) of short-range wireless communication and provide an Internet service using a cellular mobile communication network to the secondary electronic device connected to the primary electronic device. In addition, the secondary electronic device refers to an electronic device that is connected to the primary electronic device through a short-range wireless communication technology and is provided with an Internet service using a cellular mobile communication network through the primary electronic device. For example, the secondary electronic device may be an electronic device that cannot directly access a cellular mobile communication network. As another example, the secondary electronic device may be an electronic device that supports a function of directly accessing a cellular mobile communication network, but after connecting through the short-range wireless communication technology with the primary electronic device according to a user's control, indirectly accesses the cellular mobile communication network through the primary electronic device.

In the following description, a method and device for enhancing the quality of experience (QoE) of a user by differentially controlling application traffic of the primary electronic device and the secondary electronic device in a system where the secondary electronic device is provided with a communication service through the primary electronic device.

FIG. 1 illustrates a schematic structure of a system where a secondary electronic device provides a communication service through a primary electronic device, to which embodiments of the present invention are applied.

Referring to FIG. 1, each of the plurality of secondary electronic devices 102-1 to 102-3 may be connected to a primary electronic device 100 through a short-range wireless communication, and may access the Internet using a cellular network supported by the connected primary electronic device 100. That is, each of the plurality of secondary electronic devices 102-1 to 102-3 may transmit a packet for communication with a server 110 to the primary electronic device 100, and the primary electronic device 100 may transmit packets received from each of secondary electronic devices 102-1 to 102-3 to the server 110. At this time, the primary electronic device 100 may change the address and port of IP packets from each of the secondary electronic devices 102-1 to 102-3 to the server 110 based on a Network Address and Port Translation (NAPT) function, and may then transmit the changed IP packet to the server 110. In addition, the primary electronic device 100 may change the address and port of IP packets from the server 110 to the secondary electronic devices 102-1 to 102-3 based on the NAPT function, and may then transmit the changed IP packet.

Figure 2:
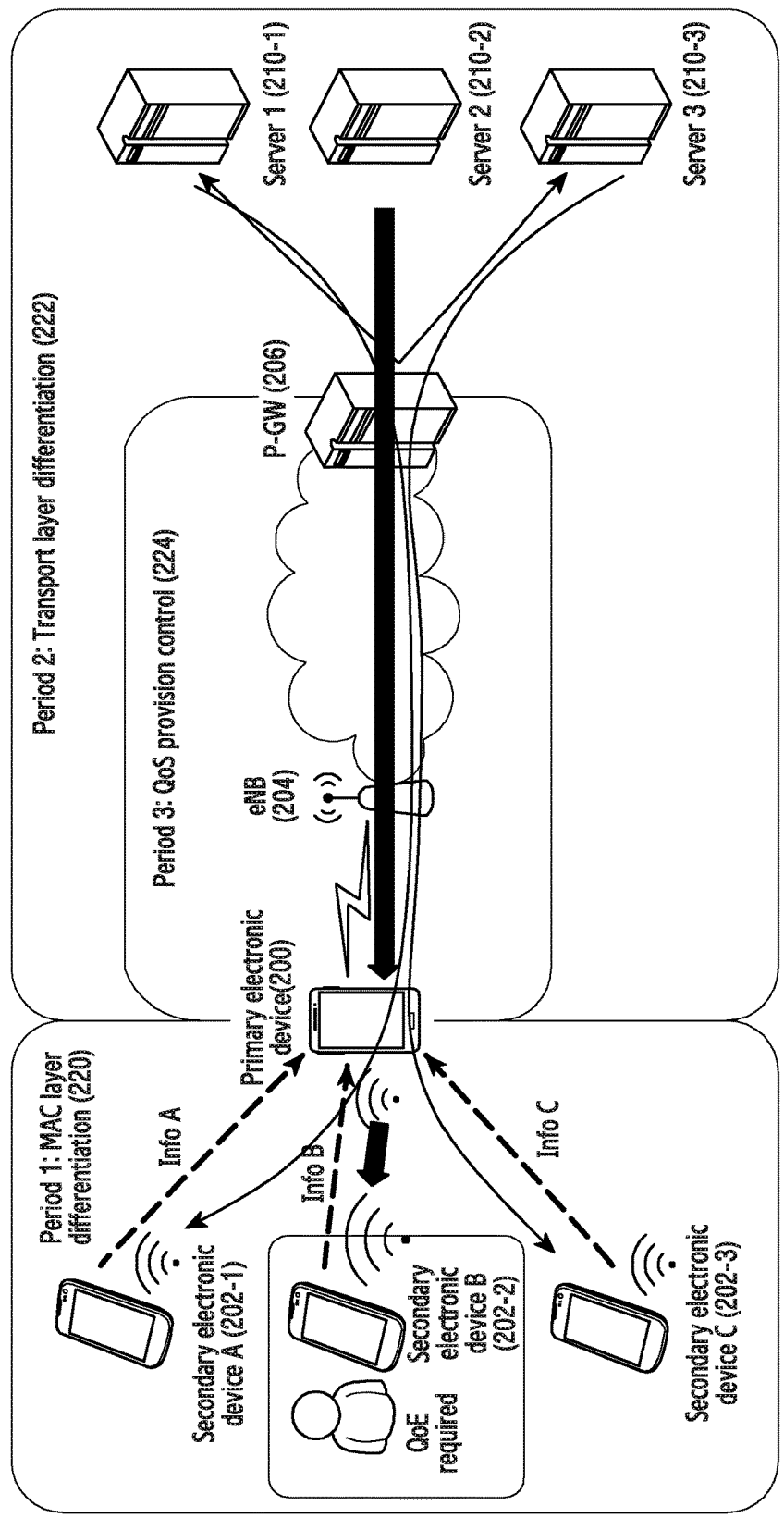
FIG. 2 is a diagram illustrating a method for differentiating traffic per period in a system where a secondary electronic device is provided with a communication service through a primary electronic device according to an embodiment of the present invention.

FIG. 2 is a diagram illustrating a method for differentiating traffic per period in a system where a secondary electronic device is provided with a communication service through a primary electronic device according to an embodiment of the present invention.

Referring to FIG. 2, each of the plurality of secondary electronic devices 202-1 to 202-3 may be connected to a primary electronic device 200 through a short-range wireless communication technology according to an embodiment of the present invention. The plurality of secondary electronic devices 202-1 to 202-3 may use a communication service through the cellular mobile communication network access function of the primary electronic device 200.

In addition, the primary electronic device 200 may be connected to the plurality of secondary electronic devices 202-1 to 202-3 connected through a short-range wireless communication technology, and may access a cellular mobile communication network through a base station (eNB, 204) to perform a function for transmitting packets, which are transmitted from the plurality of secondary electronic devices 202-1 to 202-3, to the nodes (e.g., a base station 204, P-GW 206 and/or servers 210-1 to 210-3) of a cellular mobile communication network, and transmitting packets from the nodes (e.g., the base station 204, the P-GW 206) of a cellular mobile communication network and/or the server 210-1 to 210-3 to a plurality of secondary electronic devices 202-1 to 202-3.

According to an embodiment of the present invention, the primary electronic device 200 may divide a traffic period for the plurality of secondary electronic devices 202-1 to 202-3 and/or the primary electronic devices 200 into a plurality of periods in order to provide a differential communication service based on an application being executed on the primary electronic devices 200 and the plurality of secondary electronic devices 202-1 to 202-3. For example, the traffic period for the plurality of secondary electronic devices 202-1 to 202-3 and/or the primary electronic device 200 may be divided into a period 1 that corresponds to a communication period between the plurality of secondary electronic devices 202-1 to 202-3 and the primary electronic device 200, a period 2 that corresponds to a communication period between the primary electronic device 200 and the servers 210-1 to 210-3, and a period 3 that corresponds to a communication period between the primary electronic device 200 and nodes 204 and 206 of a cellular mobile communication network.

In addition, the primary electronic device 200 may determine the priority of each part of traffic according to an application being running on the plurality of secondary electronic devices 202-1 to 202-3 and the primary electronic device 200, and may perform traffic differentiation in each period based on the priority of the traffic. For example, each of the plurality of secondary electronic devices 202-1 to 202-3 may monitor an application being executed on the corresponding secondary electronic device to acquire QoE state information per traffic of the application, and may transmit the acquired QoE state information per traffic of the application to the primary electronic device 200. The primary electronic device 200 may receive, from each of the plurality of secondary electronic devices 202-1 to 202-3, QoE state information per traffic of the application being executed on the corresponding electronic device, and acquire QoE state information per traffic of the application being executed on the primary electronic device 200. The primary electronic device 200 may determine the priority of each of the plurality of parts of traffic based on the QoE state information of each of the received traffic and acquired traffic, and may differentially control traffic for the period 1, the period 2, and the period 3 based on the determined priority. For example, the primary electronic device 200 may perform Medium Access Control (MAC) layer differentiation 220 based on the priority for each part of traffic with respect to traffic of the period 1 between the plurality of secondary electronic devices 202-1 to 202-3 and the primary electronic device 200. In addition, the primary electronic device 200 may perform transport layer differentiation 222 based on the priority for each part of traffic, with respect to traffic of the period 2 between the primary electronic device 200 and the servers 210-1 to 210-3. In addition, the primary electronic device 200 may perform quality of service (QoS) provision control 224 based on QoE state information per traffic with respect to traffic of the corresponding period 3 between the primary electronic device 200 and the network nodes 204 and 206. Hereinafter, a method of determining the priority for each part of traffic and performing differentiation for each part of traffic in each period will be described in detail.

Figure 3A:
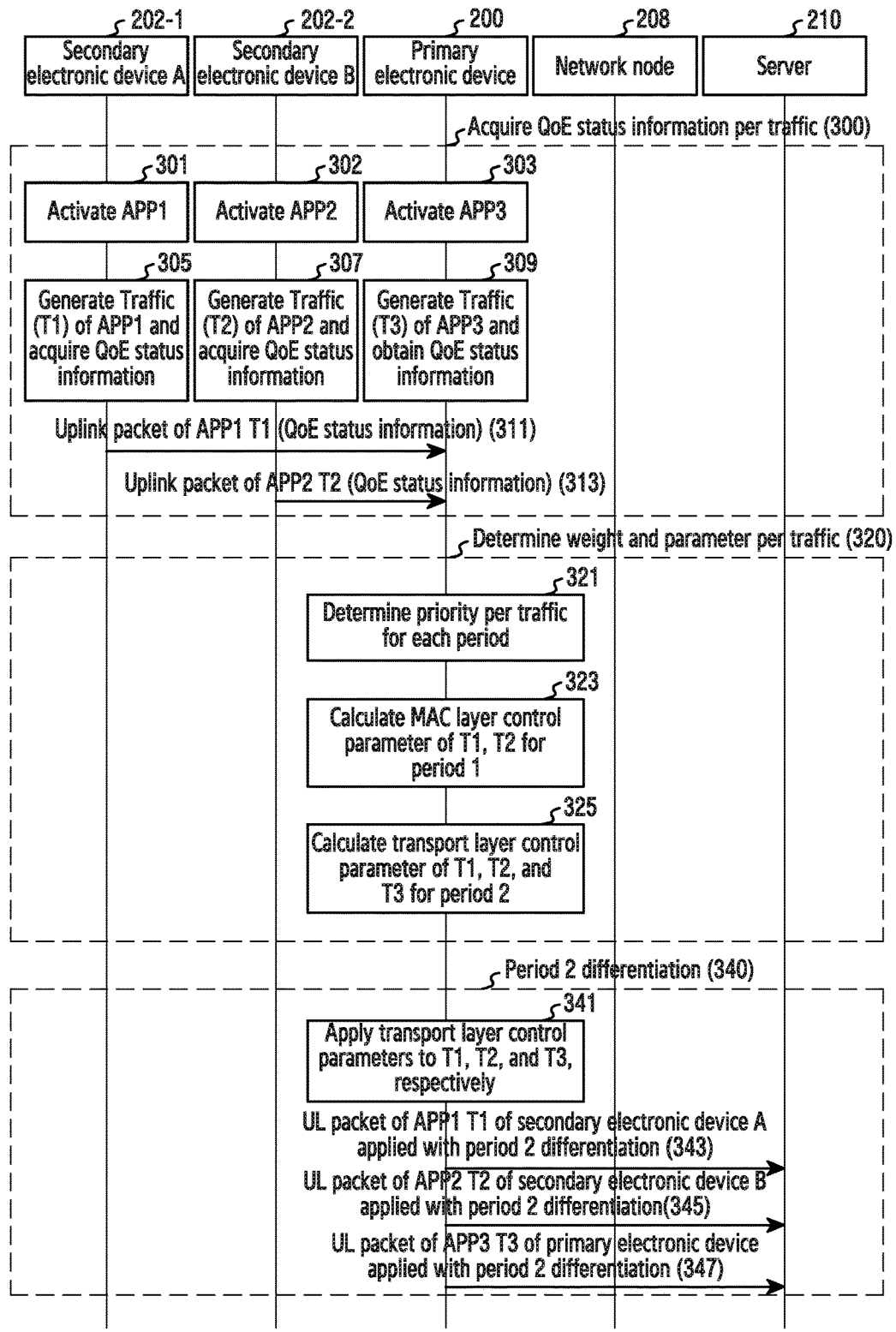
FIGS. 3A and 3B are diagrams illustrating a signal flow for differentiating traffic and processing the same in a system where a secondary electronic device is provided with a communication service through a primary electronic device according to an embodiment of the present invention.
Figure 3B:
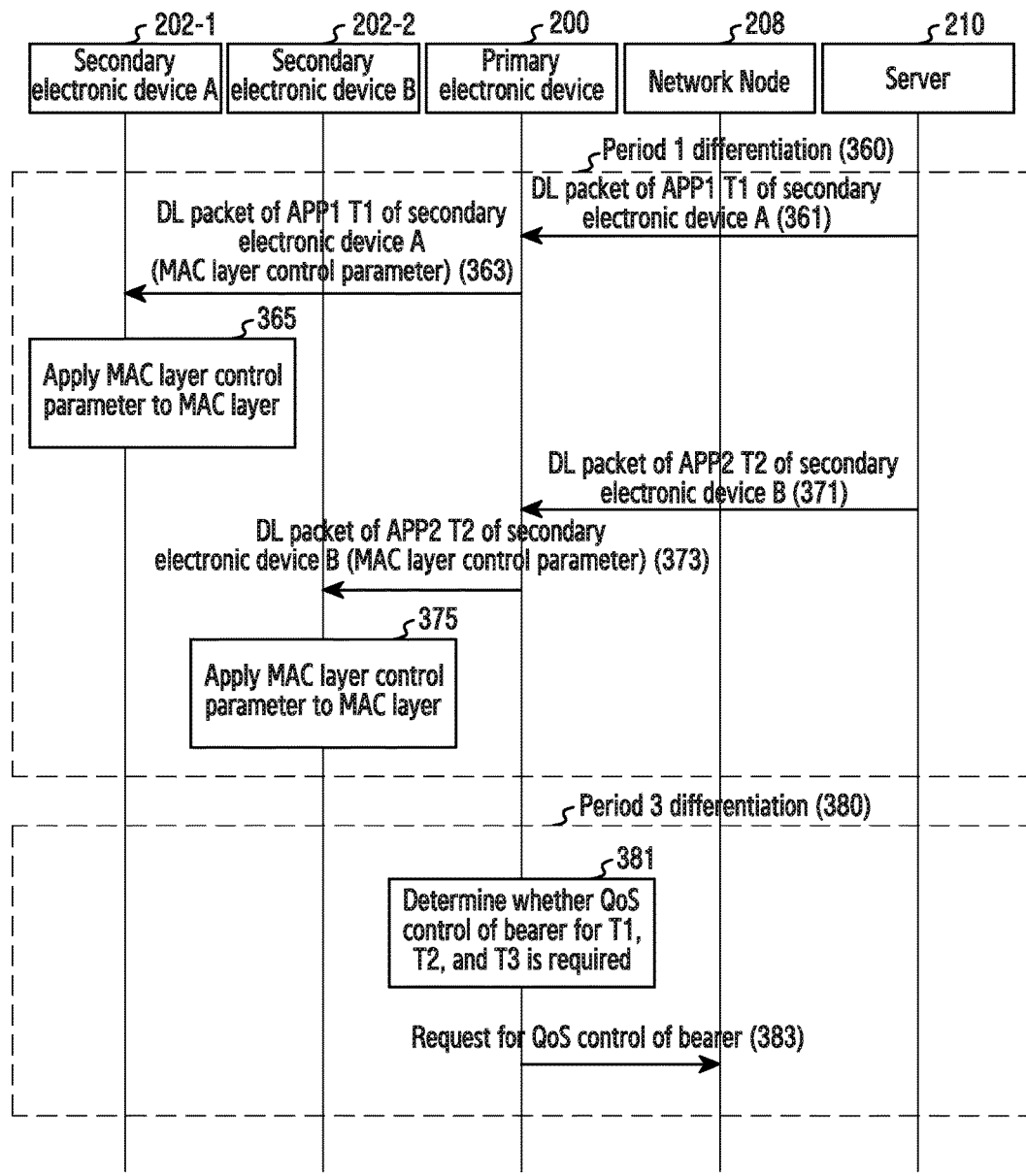

FIGS. 3A and 3B are diagrams illustrating a signal flow for differentiating traffic and processing the same in a system where a secondary electronic device is provided with a communication service through a primary electronic device according to an embodiment of the present invention. Here, for the convenience of explanation, it is assumed that two secondary electronic devices 202-1 and 202-2 are connected to the primary electronic device 200 through a short-range wireless communication technology and communicate with the server 210. In addition, in the following embodiment, for the convenience of explanation, it is also assumed that one application is executed in each of the secondary electronic device A 202-1, the secondary electronic device B 202-2, and the primary electronic device 200, and one traffic is generated by an executed application. However, the following embodiment may also be applied in the same manner when a plurality of applications are executed in at least one of the secondary electronic device A 202-1, the secondary electronic device B 202-2, and the primary electronic device 200. In addition, the following embodiment may also be applied in the same manner when at least one application generates plurality of parts of traffic, which is executed in at least one of the secondary electronic device A 202-1, the secondary electronic device B 202-2, and the primary electronic device 200. For example, it is natural that the following embodiment may also be applied in the same manner when three applications requiring communication with an external server are executed in the secondary electronic device B 202-2, and a particular application among the executed three applications generates two parts of traffic to communicate with different two external servers. In addition, in the following description, an application refers to an application that generates traffic requiring the QoE guarantee. For example, an application according to an embodiment of the present invention refers to an application that generates communication traffic with at least one other electronic device, a network node, and/or a server.

Referring to FIG. 3A and FIG. 3B, a procedure for performing traffic differentiation and processing the same according to an embodiment of the present invention may be divided into a total of five steps. For example, the procedure for traffic differentiation and processing the same may be divided into a step 300 for acquiring QoE state information per traffic, a step 320 for determining the priority and parameter for each part of traffic, a step 340 for differentiating the period 2, step 360 of differentiating the period 1, and a step 380 for differentiating the period 3. Here, the step 340 for differentiating the period 2, the step 360 for differentiating the period 1, and the step 380 for differentiating the period 3 may be changed in order, and performed at the same time.

First, the step 300 for acquiring QoE state information per traffic may be configured as follows. The secondary electronic device A 202-1 detects the activation of an application "APP1" in step 301. When the activation of the "APP1" is detected, the secondary electronic device A 202-1 generates traffic "T1" corresponding to "APP1" and acquires QoE state information on "T1" of "APP1" in step 305. Subsequently, in step 311, the secondary electronic device A 202-1 includes the QoE state information in the uplink packet of "T1" for "APP1" and transmits the same to the primary electronic device 200. For example, in step 311, the secondary electronic device A 202-1 may include the QoE state information in an option field of the header of the uplink packet of "T1" for "APP1" and transmit the same to the primary electronic device 200. In another example, the secondary electronic device A 202-1 may generate a separate message including the QoE state information and transmit the same to the primary electronic device 200.

In addition, the secondary electronic device B 202-2 detects the activation of an application "APP2" in step 302. When the activation of the "APP2" is detected, the secondary electronic device B 202-2 generates traffic "T2" corresponding to "APP2" and acquires QoE state information on "T2" of "APP2" in step 307. Subsequently, in step 313, the secondary electronic device B 202-2 includes the QoE state information in the uplink packet of "T2" for "APP2" and transmits the same to the primary electronic device 200. For example, in step 313, the secondary electronic device B 202-2 may include the QoE state information in an option field of the header of the uplink packet of "T2" for "APP2" and transmit the same to the primary electronic device 200. In another example, the secondary electronic device B 202-2 may generate a separate message including the QoE state information and transmit the same to the primary electronic device 200.

In addition, the primary electronic device 200 detects the activation of an application "APP3" in step 303. When the activation of the "APP3" is detected, the primary electronic device A 200 generates traffic "T3" corresponding to "APP3" and acquires QoE state information on "T3" of "APP3" in step 309. It is illustrated in drawings that each of the secondary electronic device A 202-1, the secondary electronic device B 202-2, and the primary electronic device 200 simultaneously performs operations of detecting the activation of an application, generating traffic corresponding to the activated application, and acquiring QoE state information. However, the time point of detecting the activation of the application and the time point of generating the traffic of each of the secondary electronic device A 202-1, the secondary electronic device B 202-2, and the primary electronic device 200 may be different.

Here, the QoE state information may be configured as shown in Table 1 below.

TABLE 1

| Items | Contents | Values |
|---|---|---|
| Differentiation (prioritization) request flag | Indicates that QoE state information is included. That is, refers to whether QoE state information is included in header information of the corresponding packet | 0/1 (0: QoE state information is not included, 1: QoE state information is included) |
| Application ID | Indicates identification information for identifying an application corresponding to the corresponding traffic in a secondary electronic device | A value that is randomly assigned, as a unique value in an electronic device |
| Application type | Indicates type of an application corresponding to the corresponding traffic | video, voice, BE, BG, Interactive, etc. |
| Device usage state of application | Indicates usage states of an input device and an output device of a current user in an application corresponding to the corresponding traffic | Screen output: in use/not in use Audio output: in use/not in use Vibration: in use/not in use Touch input: in use/not in use Microphone input: in use/not in use |
| Required bandwidth | Indicates a bandwidth required when the corresponding traffic is a realtime or multimedia transmission | A value determined by an application |
| Rrequired latency | Indicates a latency requiring guarantee when the corresponding traffic is a realtime or multimedia transmission | A value determined by an application |

In Table 1, the differentiation request flag is information indicating whether QoE state information is included in the header of the corresponding packet. When the value of the differentiation request flag is "1", the primary electronic device 200 may acquire, from the header of the corresponding packet, the QoE state information on the corresponding traffic. The primary electronic device 200 may acquire, while performing an NAPT function, 5-tuple information from the header of the corresponding packet without the QoE state information on the corresponding traffic from the header of the corresponding packet. In addition, in Table 1, the application ID is an identifier for identifying an application corresponding to the corresponding traffic in each electronic device. The application ID may be arbitrarily selected such that the application ID is not duplicated with other applications in the electronic device where the corresponding application is activated. The primary electronic device 200 may identify an application corresponding to the corresponding traffic using the application ID. In addition, the primary electronic device 200 may determine the number of applications being executed in each electronic device using the application ID. In Table 1, the application type indicates the type of application corresponding to the corresponding traffic. In addition, in Table 1, the device usage state of an application indicates the usage states of an input device and an output device in the application corresponding to the corresponding traffic. In other words, the device usage state of an application may be generated by monitoring in real time whether a current user inputs, by an input device, to the application and whether the application is output to an output device. Here, the input device may include a microphone, a touch sensor, a keyboard, a health information sensor (e.g., a sensor for measuring electrocardiogram, pulse, respiration, etc.), a gyro sensor, a GPS, and the like, and the output device may include a display, a speaker, an earphone, a vibrating element, and the like. Additionally, according to various embodiments of the present invention, an electronic device may generate the device usage state information of an application, using the number of input devices by which an input to the corresponding application is generated, a period for which an input is generated, by the input device, to the corresponding application, the frequency of input generation, by the input device, to the corresponding application, and/or the amount of input data generated, by the input device, to the corresponding application, and the like. As another example, the electronic device may generate information indicating the device usage state of an application, using the number of output devices by which an output for the application is generated, a period for which the output of the corresponding application is generated by an output device, the frequency of output generation of the corresponding application by the output device, the amount of output data generated, by the output device, in the corresponding application, and/or information on output screen size of the corresponding application in relation to the total output screen size. In addition, the required bandwidth and required latency in Table 1 may or may not be included in the QoE state information according to a design scheme.

Next, the step 320 for determining the priority and parameter for each part of traffic may be configured as follows.

As described above, the primary electronic device 200 that has acquired QoE state information for each application determines the priority per traffic for each period in step 321. That is, since QoE state information of traffic, generated by the application of the primary electronic device 200, and QoE state information of all parts of traffic passing through the primary electronic device 200 may be acquired through the step 300 for acquiring QoE state information per traffic, which has been described above, the primary electronic device 200 may determine the priority for traffic differentiation in the period 1 and the period 2 based on the acquired QoE state information. For example, the primary electronic device 200 may determine the priority for each part of traffic, as shown in Equation 1 below.

$$P_i = \frac{p_i}{\sum_{j=0}^{n} P_j/n}$$ [Equation 1]

Here, $P_i$ denotes priority for traffic i, $p_i$ and $p_j$ denote QoE points (QP) for traffic i and traffic j, respectively, and n denotes the total number of traffic using the corresponding period. The primary electronic device 200 may acquire 5-tuple information and application ID information from the header of the packet received from the secondary electronic devices 202-1 and 202-2, and may check the number of traffic using a communication period between the primary electronic device 200 and the secondary electronic devices 202-1 and 202-2 based on the acquired information. In addition, the primary electronic device 200 may check the number of traffic that use the period between the primary electronic device 200 and the secondary electronic devices 202-1 and 202-2 based on the 5-tuple information and application ID information acquired from the header of the packet received from the secondary electronic devices 202-1 and 202-2 and the number of traffic generated by the application of the primary electronic device 200. Here, the 5-tuple information may include a source IP address (SIP), a source port (SP), a destination IP address (DIP), a destination port, and type information. In addition, as shown in Table 1, the primary electronic device 200 may determine a QoE point based on device usage state information of an application for each part of traffic. For example, the primary electronic device 200 may determine a QoE point based on the number of input/output devices currently being used by the corresponding application. More specifically, when the device usage state information of an application indicates "screen output: in use, audio output: in use, vibration: not in use, touch input: not in use, microphone input: not in use", the primary electronic device 200 may check that an application corresponding to the traffic of the corresponding packet has been using a screen output device and an audio output device, and may add one point for the use of the screen output device and one point for the use of the audio output device to the basic one point, so as to determine that the QoE point is three points. For example, as shown in FIG. 4, when traffic one of "SIP: 1, DIP: 2, SP: 80, DP: 80, Type: TCP, APP ID: 1", traffic 2 of "SIP: 1, DIP: 22, SP: 123, DP: 123, Type: TCP, APP ID: 1", traffic three of "SIP: 1, DIP: 11, SP: 80, DP: 80, Type: TCP, APP ID: 2", traffic four of "SIP: 2, DIP: 2, SP: 80, DP: 80, Type: TCP, APP ID: 1" are detected, the primary electronic device 200 may calculate QP for each part of traffic 1 to traffic 4, and determine the priority of the traffic for each period according to a predetermined method such as Equation 1. FIG. 4 illustrates a table on the assumption that the IP address of the secondary electronic device A 202-1 is "1", the IP address of the secondary electronic device B 202-2 is "2", and the IP address of the primary electronic device 200 is "22". Referring to FIG. 4, the primary electronic device 200 may determine that the traffic one and two are different traffic from each other because the destination IP addresses of the traffic one and two are different even though the source IP address and the application ID of the same are identical. In addition, since the destination IP address of the traffic 2 corresponds to the IP address of the primary electronic device 200, the primary electronic device 200 may determine the corresponding traffic as traffic that uses only the period 1. Thus, the primary electronic device 200 may determine the priority w1 in period 1 for each of the traffic one to four, and may determine the priority w2 in period 2 for the traffic one, three, and four. When QP for each part of traffic and the priority per period of each part of traffic are determined, the primary electronic device 200 may store the same in the form of the table as shown in FIG. 4. Here, Equation 1 and FIG. 4 are merely illustrative for the understanding of the present invention, and the method of determining the priority in the present invention is not limited to Equation 1 and FIG. 4.

Figure 5:
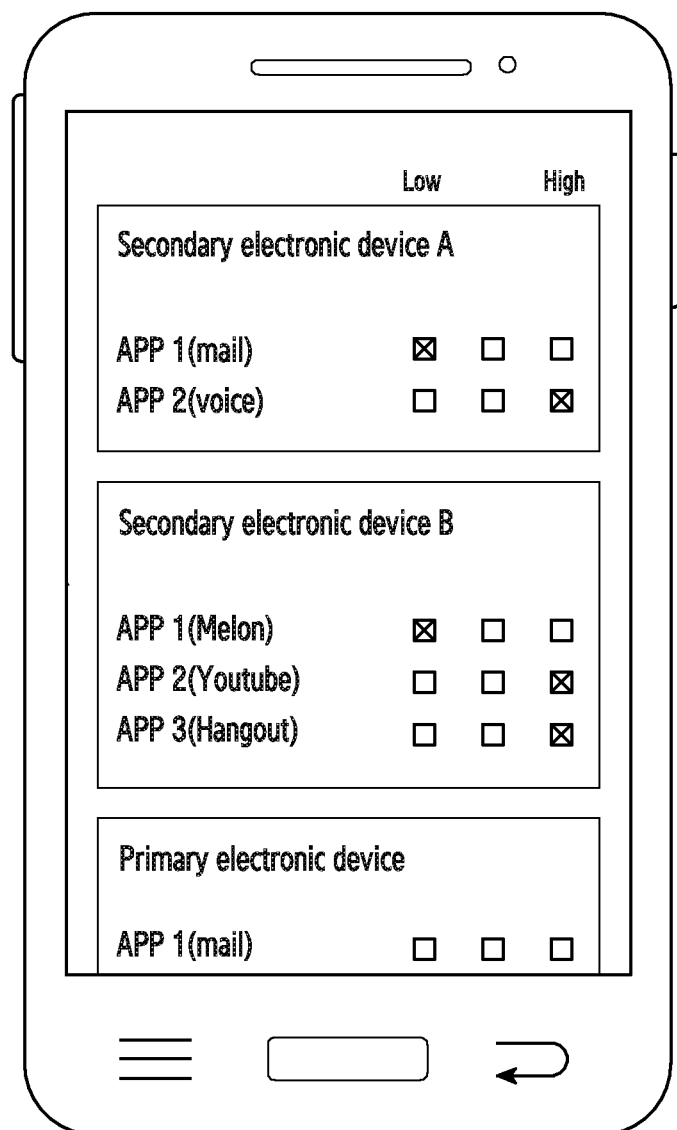
FIG. 5 is a diagram illustrating a user interface for setting the priority for each part of traffic according to an application in a primary electronic device according to an embodiment of the present invention.

In another embodiment, the primary electronic device 200 may display a user interface through which a priority for an application of each electronic device is set as shown in FIG. 5. The primary electronic device 200 may be configured to allow a user to receive information for setting the priority of the application for each electronic device through the displayed user interface. For example, as shown in FIG. 5, the primary electronic device 200 may display a user interface requesting the priority settings for each of the applications supported by the secondary electronic device A 202-1, applications supported by the secondary electronic device B 202-2, and applications supported by the primary electronic device 200, so as to set the priority for each application according to the user control. At this time, the user interface requesting the priority settings may be configured in various ways, such as an interface for the priority setting of each application as one of predetermined levels (low level, intermediate level, high level) or an interface for the priority setting of each application as a numerical value, or the like. Thus, in order to set the priority of an application by the user input, an operation of transmitting information (e.g., MAC address) for identifying the secondary electronic device A 202-1 and the secondary electronic device B 202-2, information on applications (e.g., application ID, application name, or application icon) supported by each of the secondary electronic device A 202-1 and the secondary electronic device B 202-2, to the primary electronic device 200 should be preceded at the time point when the secondary electronic device A 202-1 and the secondary electronic device B 202-2 are initially accessed or initially connected to the primary electronic device 200. In addition, when the priority of an application is set by the user input as described above, the primary electronic device 200 may acquire QoE state information configured as shown in Table 1, from the secondary electronic devices 202-1 and 202-2, through the step 300 for acquiring QoE state information per traffic, which has been described above, and may receive only the application ID information on each part of traffic from the secondary electronic devices 202-1 and 202-2.

The primary electronic device 200 calculates the priority for each part of traffic, and then calculates the MAC layer control parameter of each of the plurality of parts of traffic (e.g., T1 and T2) for the period 1 in step 323. For example, the period 1 may utilize a radio frequency band through the wireless connection technology such as Carrier Sense Multiple Access (CSMA)/Collision Avoid (CA) based on a wireless LAN or Bluetooth defined in 802.11. Thus, the primary electronic device 200 may determine parameters used for media access based on the CSMA/CA by each electronic device, based on the priority of the period 1 for each part of traffic. For example, the primary electronic device 200 may determine parameters that allow high priority traffic for the period 1 to have more transmission opportunities than low priority traffic for the period 1 in a contention free period. In another example, the primary electronic device 200 may determine the medium access probability for each part of traffic and/or the length of a time period (transmission opportunity (TXOP)) at which the medium may be independently used during a contention period. For example, the primary electronic device 200 may determine the medium access probability for the traffic having the highest priority in the period 1 to be the highest, and determine the TXOP length to be the longest. In addition, the primary electronic device 200 may determine the medium access probability for the traffic having the lowest priority in the period 1 to be the lowest, and determine the TXOP length to be the shortest. According to an embodiment, a MAC layer control parameter may include information indicating media access opportunities in the contention free period, and information indicating the medium access probability and the length of the TXOP in the contention period. In another embodiment, the MAC layer control parameter may include another parameter that may differentiate the traffic of the period 1 and process the same.

The primary electronic device 200 calculates the transport layer control parameter of each of the plurality of parts of traffic (e.g., T1, T2, and T3) for the period 2 in step 325. For example, at least one parameter for adjusting a TCP transmission (sending) rate and/or an UDP transmission (sending) rate of the period 2 may be calculated. For example, since the TCP transmission rate is determined by three factors of the congestion window (CWND), that is Round Trip Time (RTT), RCVD, and packet loss, the primary electronic device 200 may calculate a parameter that controls at least one of the RTT, RCVD, and packet loss for TCP-type traffic based on the priority for the period 2 of each part of traffic. In another example, since the UDP transmission rate may be changed by delay, packet loss, or bandwidth, and the like, reported from an electronic device to a server, the primary electronic device 200 may calculate a parameter that adjusts at least one of the delay, packet loss, and bandwidth for UDP-type traffic, based on the priority for the period 2 of each part of traffic.

In step 320 for determining the priority and parameter per traffic as described above, since the order of step 323 and step 325 is described for illustrative purposes, the order of the steps may be changed. For example, the step 323 and the step 325 may be performed at the same time, and the step 325 may be performed before the step 323.

Next, the period 2 differentiation step 340 may be configured as follows.

When the transport layer control parameter for each part of traffic is calculated through step 320 for determining the priority and parameter per traffic, which has been described above, the primary electronic device 200 applies the transport layer control parameter to traffic of the period 2 in step 341. Then, the primary electronic device 200 transmits, to the server 210, the uplink packet of each part of traffic to which the differentiation for the period 2 is applied, as in step 343, step 345, and step 347. For example, the primary electronic device 200 may apply the calculated TCP transmission rate control parameter for TCP-type traffic so as to increase the transmission rate of high-priority traffic, and decrease the transmission rate of low-priority traffic. In a more detailed example, when the transport layer control parameter for traffic one of the TCP type having the highest priority is a parameter indicating an ACK split transmission, the primary electronic device 200 may split the TCP ACK of the traffic one and transmit the same to the server 210, so as to increase the transmission rate of the server. In another example, when the transport layer control parameter for traffic two of TCP type having the lowest priority is a parameter indicating an increase in RTT, the primary electronic device 200 may delay the uplink packet of traffic two for a predetermined time or longer and then transmit the delayed packet to the server 210 to forcibly increase the RTT, thereby decreasing the transmission rate of the traffic two. As another example, when the transport layer control parameter for traffic two of the TCP type having the lowest priority is a parameter indicating a reduction in RCVD, the primary electronic device 200 may describe the RCVD value of the TCP ACK of traffic two as a value smaller than the value described in the corresponding secondary electronic device 202-2 and may transmit the same to the server 200, so as to decrease the transmission rate of the traffic two. As another example, when the transport layer control parameter for traffic two of the TCP type having the lowest priority is an indication of explicit congestion notification (ECN) bit/an indication of explicit congestion notification-echo (ECE) bit, the primary electronic device 200 may describe the ECN bit indication of the primary electronic device 200 in the ECE bit of the ACK bit of traffic two of the secondary electronic device 202-2 and may transmit the same to the server 210, so as to decrease the transmission rate of the traffic two. As another example, when the transport layer control parameter for traffic two of the TCP type having the lowest priority is a duplicated ACK transmission, the primary electronic device 200 may fictitiously generate a duplicated ACK for traffic two under the circumstances that there is no packet loss for traffic two and may transmit the same to the server 210, so as to decrease the transmission rate of the traffic two.

In still another embodiment, the primary electronic device 200 may explicitly command, to the secondary electronic devices 202-1, 202-2, the transport layer speed control for the traffic, based on the priority for each part of traffic and the transport layer control parameter for each part of traffic, determined as described above. For example, the primary electronic device 200 may transmit, to the secondary electronic devices 202-1, 202-2, a message that commands lowering of the transport layer speed for traffic of the secondary electronic devices 202-1, 202-2 having relatively lower priorities. The primary electronic device 200 may include a command for controlling the transport layer speed of traffic for a specific application in the IP packet which is transmitted to the secondary electronic devices 202-1 and 202-2 and transmit the same, and may generate a separate command message for controlling the transport layer speed of traffic for a specific application and transmit the same. The secondary electronic devices 202-1 and 202-2, which have received the transport layer speed control command message, may control the transport layer speed of the corresponding traffic. For example, the secondary electronic devices 202-1 and 202-2, which have received the message that commands the lowering of the transport layer speed, may decrease the speed for the downlink traffic to which the command the lowering of the transport layer speed is input, using a method of decreasing the RCVD value of the TCP ACK and transmitting the same, a method of delaying the TCP ACK and transmitting the same, a method of indicating an ECN bit, and the like, which have been described above. The secondary electronic devices 202-1 and 202-2, which have received the message that commands the lowering of the transport layer speed, may use a method of decreasing the TCP congestion window (CWND) to directly decrease the transmission rate when the corresponding traffic is the uplink TCP traffic. The secondary electronic devices 202-1 and 202-2, which have received the message that commands the lowering of the transport layer speed, may directly decrease its own transport layer speed for the uplink traffic, or may decrease a reporting report for the downlink traffic to be transmitted to the server when the corresponding traffic is UDP traffic.

In addition, the primary electronic device 200 may transmit the transport layer control parameter of each part of traffic (e.g., T1, T2, and T3) calculated in step 325 to the secondary electronic devices 202-1, 202-2 to induce the secondary electronic devices 202-1 and 202-2 to control the transmission rate of the corresponding traffic. For example, the primary electronic device 200 may fill in an IP packet corresponding to each part of traffic, at least one parameter calculated for controlling a TCP transmission rate and/or a UDP transmission rate for each part of traffic and transmit the same, or may transmit the same, by using a separate message, to the secondary electronic devices 202-1 and 202-2. The parameters transmitted from the primary electronic device 200 to the secondary electronic devices 202-1 and 202-2 may include a parameter for controlling at least one of the RTT, RCVD, CWND, and packet loss of the TCP traffic of the secondary electronic devices 202-1 and 202-2, and/or a parameter for controlling at least one of delay, packet loss, and bandwidth of the UDP traffic of the secondary electronic devices 202-1 and 202-2. According to an embodiment, the parameter used to control the transport layer speed for a particular traffic in the primary electronic device 200 and the parameter used to control the transport layer speed for a particular traffic in the secondary electronic devices 202-1 and 202-2 may be the same as or different from each other.

In the above-described example, a method of decreasing the transmission rate for TCP-type traffic having low priorities may have an effect of increasing the transmission rate for TCP-type traffic having relatively high priorities. In addition, the method of increasing the transmission rate for TCP-type traffic having high priorities may have an effect of decreasing the transmission rate for TCP-type traffic having relatively low priorities. For example, when the transmission rate of one flow transmitted through a particular path according to the characteristics of TCP decreases, the transmission rate of other flows transmitted through the same path according to the characteristics of TCP increases.

Next, the period 1 differentiation step 360 may be configured as follows.

The primary electronic device 200 receives, from the server 210, downlink packets for each of the plurality of parts of traffic of the secondary electronic devices 202-1 and 202-2, in step 361 and step 371. The primary electronic device 200 includes the MAC layer control parameter information determined for the corresponding traffic in the downlink packets of the traffic corresponding to each of the secondary electronic devices 202-1 and 202-2, and transmits the downlink packets including MAC layer control parameter information to the secondary electronic devices 202-1 and 202-2 in step 363 and step 373. For example, the primary electronic device 200 may use the downlink packet transmitted from the server 210 to the secondary electronic devices 201-1 and 202-2 in order to transmit the MAC layer control parameter determined for each of the traffic that uses the period 1, to the corresponding secondary electronic devices 202-1 and 202-2. As another example, the primary electronic device 200 may use the downlink packet to be transmitted from the primary electronic device 200 to the corresponding secondary electronic device in order to transmit the MAC layer control parameter to the corresponding secondary electronic device with respect to the traffic that uses the period 1. In another example, the primary electronic device 200 may generate a separate message including the MAC layer control parameter per traffic, and may transmit the message to the corresponding secondary electronic devices 202-1 and 202-2.

Figure 10:
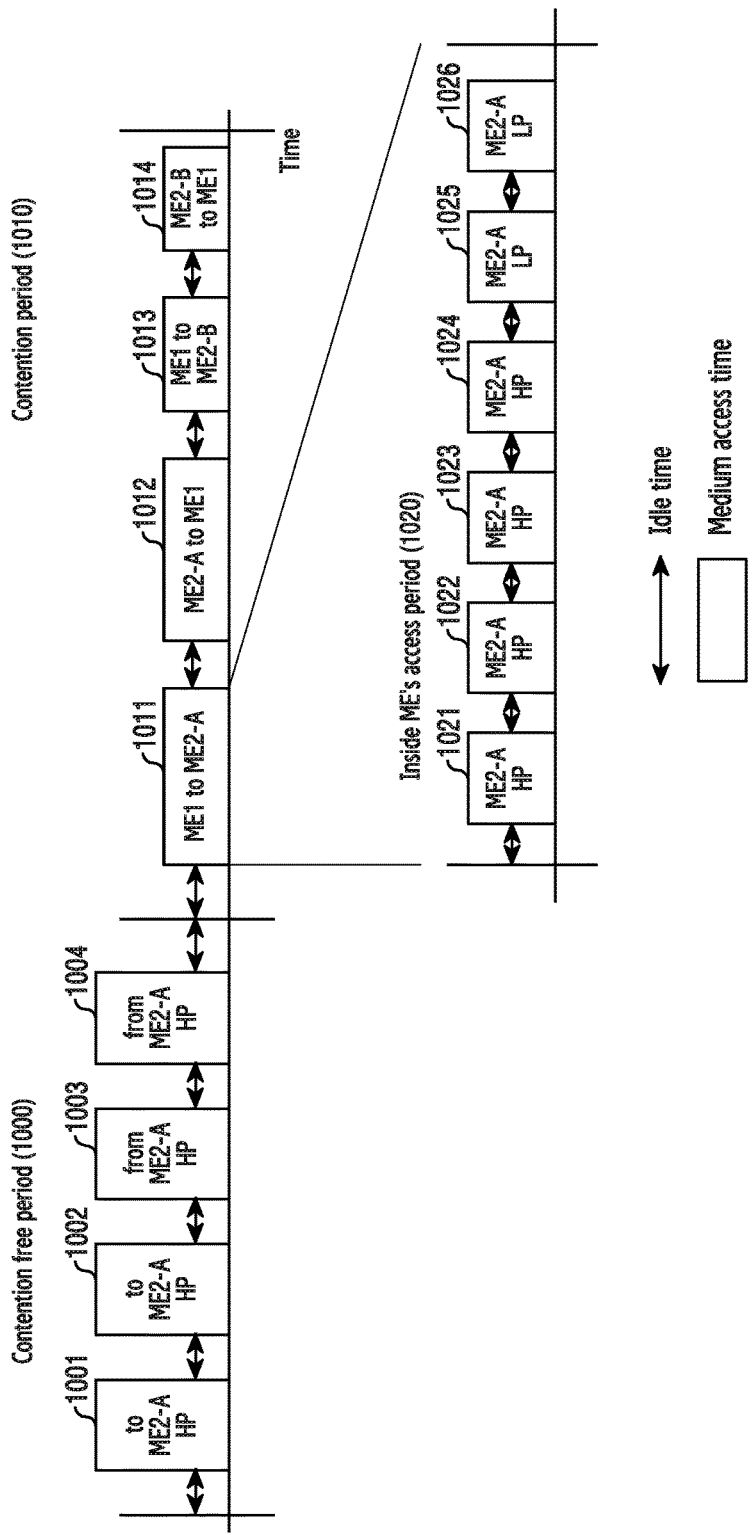
FIG. 10 is a diagram illustrating an example of performing MAC layer differentiation for traffic between a primary electronic device and a secondary electronic device according to an embodiment of the present invention.

Each of the secondary electronic devices 202-1 and 202-2 applies the MAC layer control parameter received from the primary electronic device 200 to the MAC layer in step 365 and step 375. For example, each of the secondary electronic devices 202-1 and 202-2 may apply the MAC layer control parameter to the MAC layer to perform media access as shown in FIG. 10. For example, each of the secondary electronic devices 202-1 and 202-2 may acquire a parameter indicating a medium access opportunity in a contention free period (CFP) 1000 as the MAC layer control parameter, and may perform media access in the CFP 1000 according to the acquired parameter. As another example, each of the secondary electronic devices 202-1 and 202-2 may acquire the medium access probability for each part of traffic during the contention period (CP) 1010, and/or the length of a time period (transmission opportunity (TXOP)) at which the medium can be independently used, as the MAC layer control parameter, attempt to access the medium based on the probability of the medium access acquired in the CP 1010, and when the medium access in the CP 1010 is successful, exclusively use the medium according to the length of the TXOP. In addition, each of the secondary electronic devices 202-1 and 202-2 may preferentially transmit a packet corresponding to high-priority traffic during a period 1020 that exclusively uses the medium according to the length of the TXOP.

Finally, the period 3 differentiation step 380 may be configured as follows.

The primary electronic device 200 determines whether the QoS control of the bearer is required for traffic using period 3 in step 381, and makes a request for the QoS control of the corresponding bearer to the network node 208 for the traffic, which is determined to require the QoS control of the bearer, in step 383. For example, the primary electronic device 200 may check the QoS request of each part of traffic based on the QoE state information of each part of traffic that uses the period 3, determine whether the QoS provision of the bearer used by the corresponding traffic satisfies the request of the corresponding traffic, and when the QoS provision of the bearer does not satisfy the request of the corresponding traffic, may request for the QoS change of the bearer of the corresponding traffic to the network node 208. Here, the network node 208 may include at least one of the base station 204 and the P-GW 206.

Figure 6:
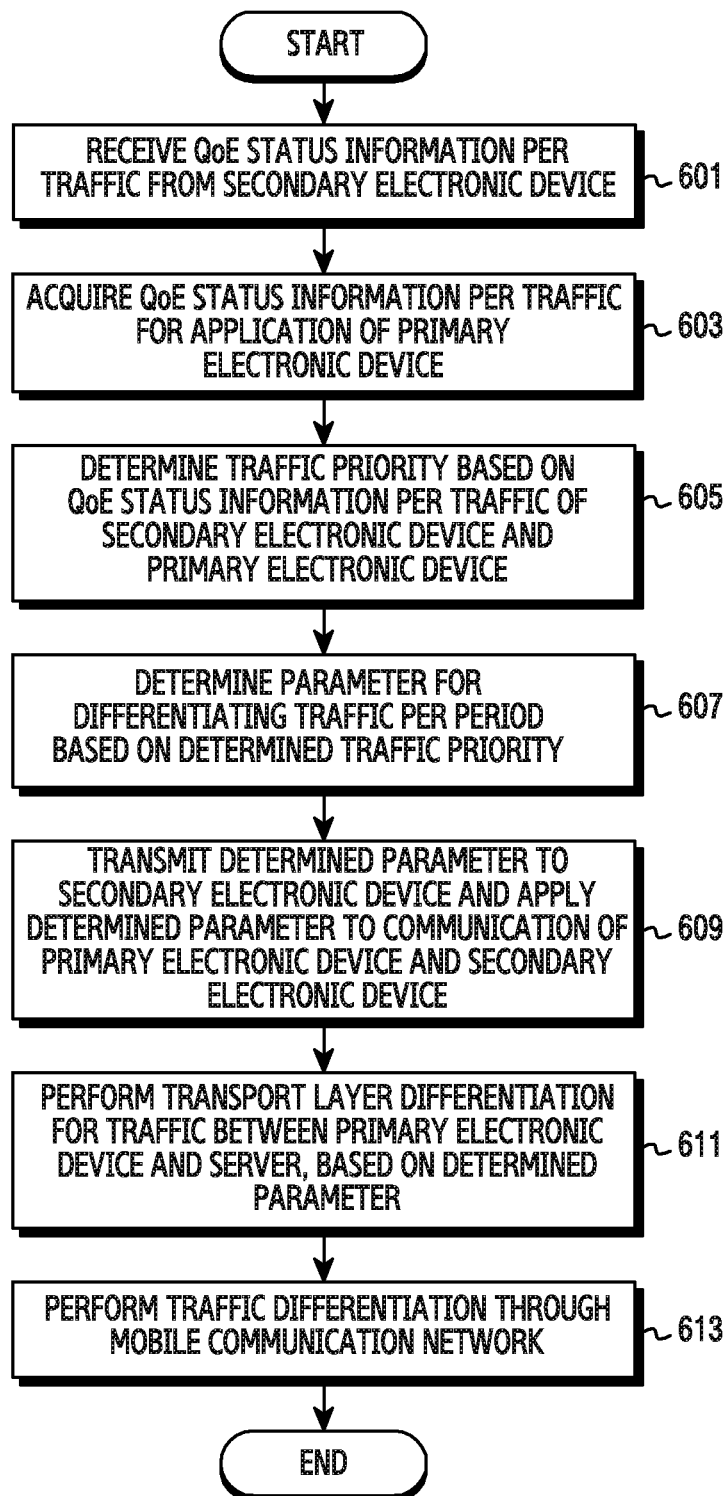
FIG. 6 is a diagram illustrating a procedure for traffic differentiation in a primary electronic device according to an embodiment of the present invention.

FIG. 6 is a diagram illustrating a procedure for traffic differentiation in a primary electronic device according to an embodiment of the present invention.

Figure 9A:
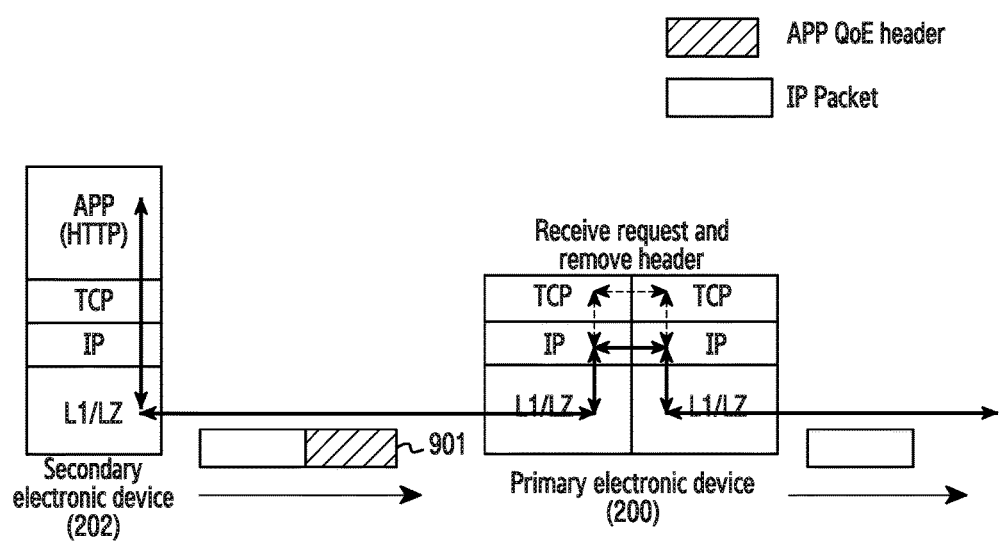
FIG. 9A is a diagram illustrating an example of acquiring QoE state information per traffic of a secondary electronic device in a primary electronic device according to an embodiment of the present invention.

Referring to FIG. 6, the primary electronic device 200 may receive QoE state information per traffic from the secondary electronic device in step 601. For example, the primary electronic device 200 may receive an IP packet to be transmitted from the secondary electronic device 202 to the network node 208 and/or the server 210, as shown in FIG. 9A, and acquire QoE state information of traffic according to the application from the header 901 of the received IP packet. In another example, the primary electronic device 200 may receive a separate message including QoE state information per traffic from the secondary electronic device. Here, the QoE state information per traffic may be configured as shown in Table 1 above. Further, according to an embodiment, the QoE state information may be periodically received from the secondary electronic device, and received whenever changes in the QoE state information are detected in the secondary electronic device.

The primary electronic device 200 acquires QoE state information per traffic for the application executed by the primary electronic device 200 in step 603. The primary electronic device 200 may monitor an application generating traffic among applications being executed, and may acquire the QoE state information as shown in Table 1.

Then, in step 605, the primary electronic device 200 determines the priority for each part of traffic based on QoE state information per traffic of the secondary electronic device and the primary electronic device. For example, the primary electronic device 200 may determine a period used by the traffic generated in the primary electronic device 200 and traffic passing through the primary electronic device 200, and determine the priority of traffic each of the period 1 and the period 2. In another example, the primary electronic device 200 may receive application identification information from at least one secondary electronic device, display a user interface requesting the priority settings of applications supported by the primary electronic device 200 and the secondary electronic device based on the received application identification information, and then determine the priorities based on the user input through the user interface.

Then, the process proceeds to step 607 in which the primary electronic device 200 determines parameters for differentiating traffic per period based on the priority of each part of traffic. According to an embodiment of the present invention, the primary electronic device 200 may determine MAC layer control parameter for traffic of the period 1 in order to differentiate the traffic that uses the period 1 and process the same. For example, when medium access is performed according to the CSMA/CA wireless access technology, the primary electronic device 200 may determine parameters that allow the traffic having high-priority for the period 1 to have more transmission opportunities than traffic having low-priority for period 1 during the contention free period (CFP). In another example, when each secondary electronic device 202 generates a plurality of parts of traffic, the primary electronic device 200 may schedule such that the secondary electronic device having the greatest sum of the priorities for the plurality of parts of traffic is allowed to have more transmission opportunities. In another example, when medium access is performed according to the CSMA/CA wireless access technology, the primary electronic device 200 may determine the probability of the medium access for each part of traffic and/or the length of a time period (transmission opportunity (TXOP)) at which the medium can be independently used during a contention period on the basis of the traffic priority of the period 1. In addition, according to an embodiment of the present invention, the primary electronic device 200 may determine a transport layer control parameter for traffic using period 2 in order to differentiate the traffic using the period 2 and process the same. For example, the secondary electronic device 202 may calculate at least one parameter for adjusting the TCP transmission rate and/or the UDP transmission rate of each part of traffic based on the priority per traffic of the period 2. For example, since the TCP transmission rate is determined by three factors of the congestion window (CWND), that is Round Trip Time (RTT), RCVD, and packet loss, the primary electronic device 200 may calculate a parameter that controls at least one of the RTT, RCVD, and packet loss for TCP-type traffic based on the priority for the period 2 of each part of traffic. As another example, since the UDP transmission rate may be changed by delay, packet loss, or bandwidth, and the like, reported from an electronic device to a server, the primary electronic device 200 may calculate a parameter that adjusts at least one of the delay, packet loss, and bandwidth for UDP-type traffic, based on the priority for the period 2 of each part of traffic.

Figure 9B:
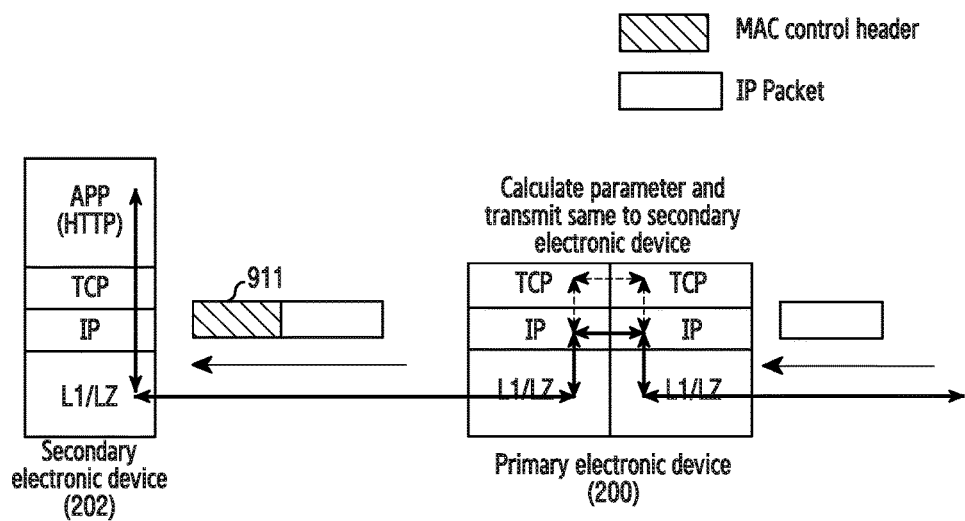
FIG. 9B is a diagram illustrating an example of transferring a parameter for differentiating traffic of a secondary electronic device in a primary electronic device according to an embodiment of the present invention.
Figure 9C:
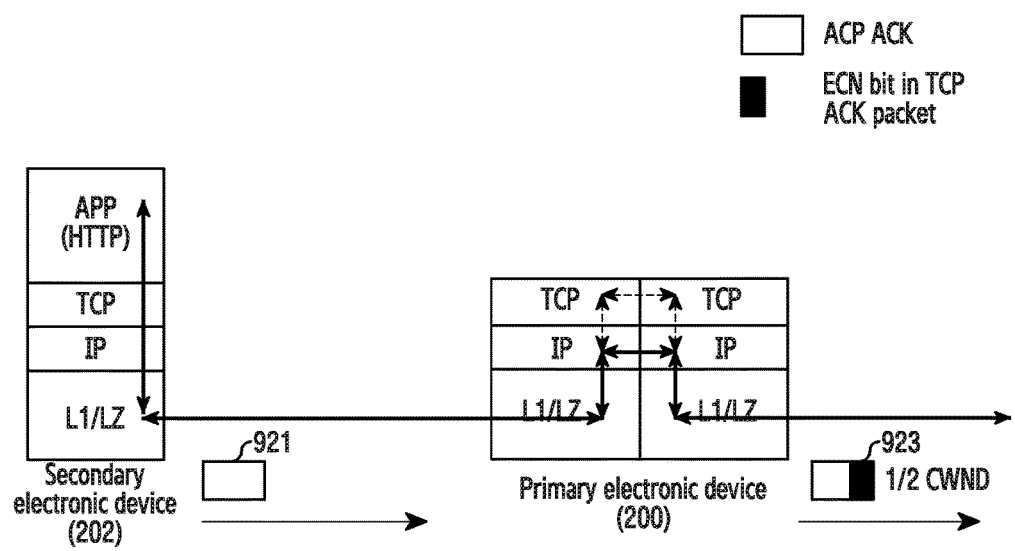
FIG. 9C and FIG. 9D are diagrams illustrating an example of performing a transport layer differentiation for traffic between a primary electronic device and a server in the primary electronic device according to an embodiment of the present invention.

In step 609, the primary electronic device 200 transmits the parameter determined through step 607 to the secondary electronic device, and applies the determined parameter to communication between the primary electronic device 200 and the secondary electronic device. For example, the primary electronic device 200 may include the MAC layer control parameter in a header 911 of an IP packet provided from the primary electronic device 200 to the secondary electronic device 202 and transmit the same, as shown in FIG. 9B. As another example, the primary electronic device 200 may generate, for each of the secondary electronic devices, a separate message including the MAC layer control parameter of traffic corresponding to the secondary electronic device, and transmit the generated separate message to the corresponding secondary electronic device.

Figure 9D:
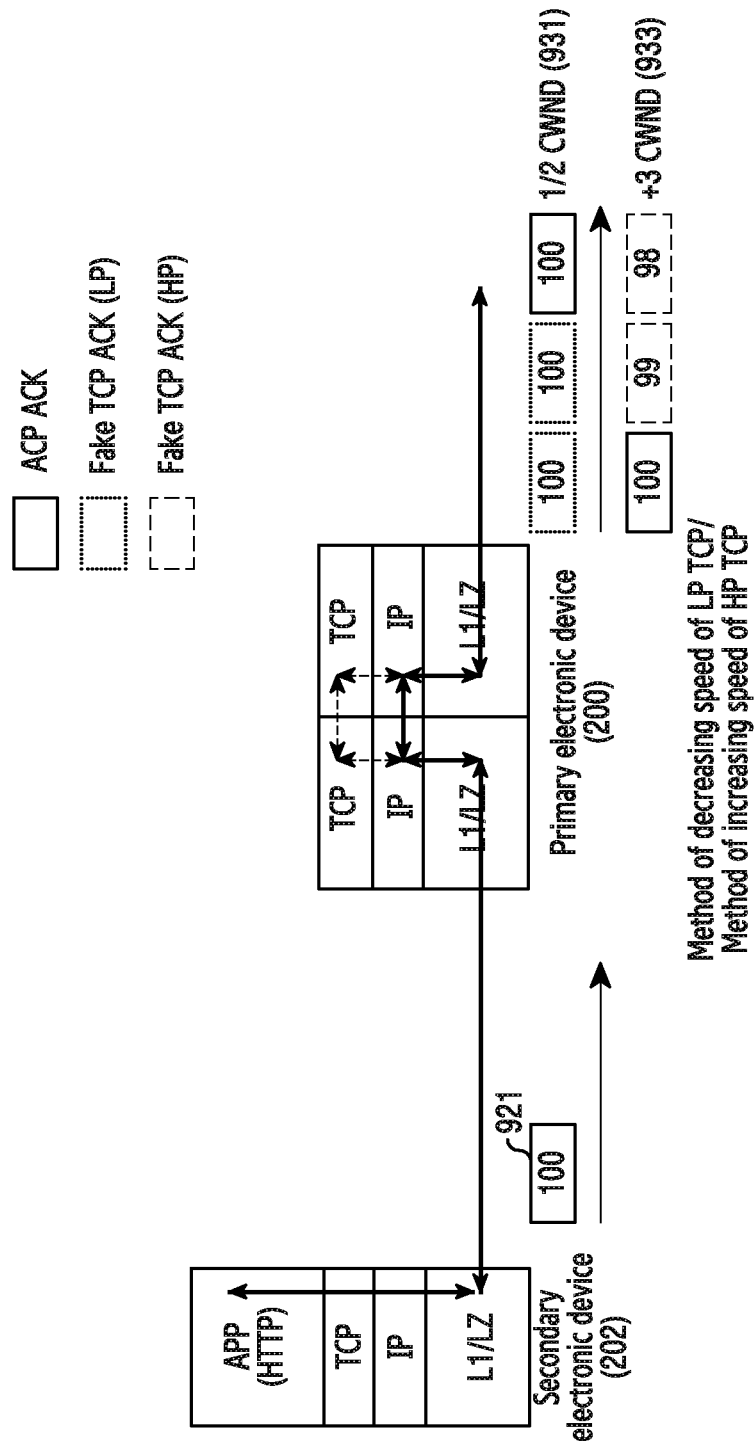

In operation 611, the primary electronic device 200 performs the transport layer differentiation of traffic between the primary electronic device 200 and the server 210, based on the parameter determined through operation 607. In other words, the primary electronic device 200 may control the transmission rate of the traffic of the period 2, based on the transport layer control parameter determined based on the traffic priority of the period 2. According to an embodiment of the present invention, the transport layer control parameter for TCP traffic having a relatively low priority among traffic of the period 2 may be a parameter for decreasing the TCP transmission rate. In this case, the primary electronic device 200 may decrease the transmission rate for TCP traffic having a relatively low priority by using the increase of RTT, the decrease of the RCVD value, ECN bit and ECE bit indication, duplicated ACK transmission, and the like. In an example, as shown in FIG. 9, when a TCP ACK packet 921 to be transmitted from the secondary electronic device 202 to the server 210 is received, the primary electronic device 200 may indicate the ECN bit 923 in the received TCP ACK packet 921, and may transmit, to the server 210, the TCP ACK packet 921 added with the ECN bit 923 indication, so as to decrease the transmission rate of the corresponding TCP traffic while decreasing the size of the CWND. In addition, as shown in FIG. 9D, when a TCP ACK packet 921 to be transmitted from the secondary electronic device 202 to the server 210 is received, the primary electronic device 200 may generate a plurality of TCP ACK packets having the same sequence number 100 as the sequence number 100 of the received TCP ACK packet 921, and transmit, to the server 210, the received TCP ACK packet and the generated TCP ACK packets 931, so as to decrease the transmission rate of the corresponding TCP traffic while decreasing the size of the CWND. As another example, the transport layer control parameter for TCP traffic having a relatively high priority among the traffic of period 2 may be a parameter for increasing the TCP transmission rate. In this case, the primary electronic device 200 may use the method of splitting the TCP ACK so as to improve the transmission rate for the TCP traffic having a relatively high priority. Here, since the method of dividing the TCP ACK is a method in which the primary electronic device 200 splits one TCP ACK into n ACKs 933 of which sequence numbers are not duplicated, and transmits the same to the server 210, as shown in FIG. 9D, the CWND of the server 210 may increase by n, not by 1, thereby decreasing the transmission rate of the corresponding TCP traffic. In addition, according to an embodiment of the present invention, the transport layer control parameter for TCP traffic having a relatively low priority among traffic of the period 2 may be a parameter for decreasing the UDP transmission rate. In this case, the primary electronic device 200 may increase the delay and/or packet loss value reported, by the primary electronic device 200, to the server 210, to be indicated as a value greater than the delay and/or packet loss value for the actual network conditions, so as to decrease the transmission rate for the corresponding UDP traffic. On the contrary, with respect to UDP traffic having a relatively high priority among the traffic of the period 2, the primary electronic device 200 may decrease the delay and/or packet loss value reported, by the primary electronic device 200, to the server 210, to be indicated as a value smaller than the delay and/or packet loss value for the actual network conditions, so as to increase the transmission rate for the corresponding UDP traffic. According to various embodiments of the present invention, the primary electronic device 200 may transmit the transport layer control parameters determined through step 607 to the secondary electronic device 202, and may command to the secondary electronic device 202 to directly increase or decrease the transmission rate of the corresponding traffic in step 611. The primary electronic device 200 may include the transport layer control parameter determined for the corresponding traffic in the packet transmitted from the primary electronic device 200 to the secondary electronic device and transmit the same, or may generate a separate control message including the transport layer control parameter to each part of traffic and transmit the same to the secondary electronic device. According to an embodiment, the primary electronic device 200 may command, to the secondary electronic device 202, controlling of the transport layer speed for traffic while controlling the transport layer speed for each part of traffic. According to an embodiment, the primary electronic device 200 may command, to the secondary electronic device 202, controlling of the transport layer speed for traffic without controlling the transport layer speed for each part of traffic. According to still another embodiment, the primary electronic device 200 may control the transport layer speed for a particular traffic, and may command to the secondary electronic device 202 to perform transport layer speed control with respect to the remaining traffic requiring transport layer speed control.

Figure 8:
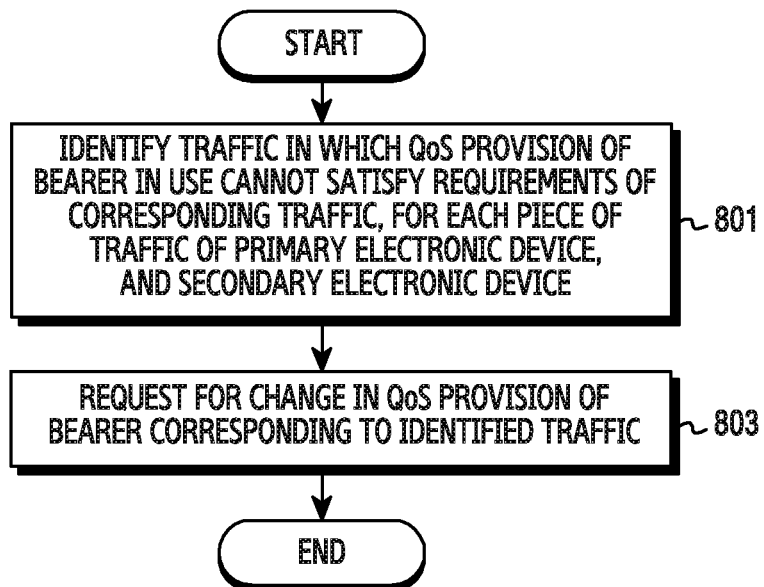
FIG. 8 is a diagram illustrating a procedure for traffic differentiation for a period between a primary electronic device and a mobile communication network in a primary electronic device according to an embodiment of the present invention.

In step 613, the primary electronic device 200 performs traffic differentiation to the mobile communication network. Here, the traffic differentiation operation may be configured to steps as shown in FIG. 8. For example, in step 801, the primary electronic device 200 may identify traffic in which the QoS provision of the bearer in use, for each part of traffic of the primary electronic device 200 and the secondary electronic device 202, cannot satisfy the requirements of the corresponding traffic. Then, in step 803, the primary electronic device 200 makes a request for changing of the QoS provision of the bearer corresponding to traffic identified as the network node 208 of the mobile communication network. For example, the primary electronic device 200 checks the QoS request of each part of traffic based on the QoE state information of each part of traffic that uses the period 3, and determines whether the QoS provision of the bearer used by the corresponding traffic satisfies the request of the corresponding traffic. When the QoS provision of a particular bearer does not satisfy the requirement of particular traffic, the primary electronic device 200 may make a request for the change of the particular bearer in order to satisfy the QoS of the particular traffic to the network node 208. Here, the network node 208 may include at least one of the base station 204 and the P-GW 206. Additionally, the node 208, which has received the request for the QoS change from the primary electronic device 200, may perform a function for changing the QoS provision of the corresponding bearer.

Then, the primary electronic device 200 terminates the procedure according to an embodiment of the present invention. In FIG. 6, step 609, step 611, and step 613 may be performed sequentially, or may be performed simultaneously in parallel, and the order of the same may be changed. For example, steps 609, step 611, and step 613 may be performed whenever traffic for the corresponding period is generated.

Figure 7:
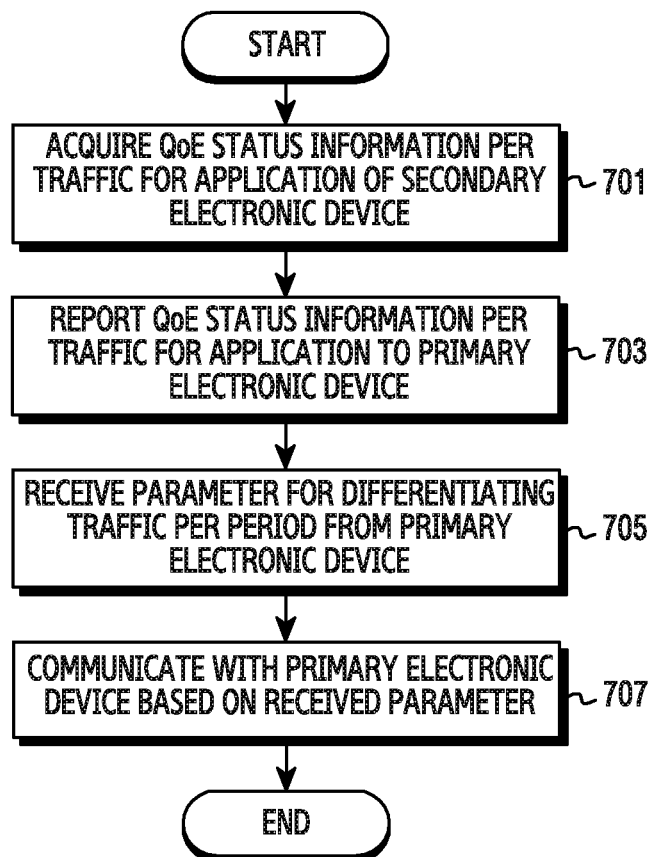
FIG. 7 is a diagram illustrating a procedure for traffic differentiation in a secondary electronic device according to an embodiment of the present invention.

FIG. 7 is a diagram illustrating a procedure for traffic differentiation in a secondary electronic device according to an embodiment of the present invention. Here, the secondary electronic device 202 may be one of the secondary electronic devices 102-1, 102-2, 102-3 shown in FIG. 1, and the secondary electronic devices 202-1, 202-2, 202-2 shown in FIG. 2.

Referring to FIG. 7, the secondary electronic device 202 acquires QoE state information per traffic for an application being executed in the secondary electronic device, in step 701. For example, the secondary electronic device 202 may monitor an application that generates traffic among applications being executed, and may acquire the QoE state information as shown in Table 1.

Then, in step 703, the secondary electronic device 202 transmits QoE state information per traffic for each application to the primary electronic device 200. For example, the secondary electronic device 202 may include, in the header 901 of an IP packet to be transmitted to the network node 208 and/or the server 210, QoE state information of traffic according to an application, and may then transmit the same to the primary electronic device 200, as shown in FIG. 9A. In another example, the secondary electronic device 202 may generate a separate message including QoE state information per traffic and transmit the same to the primary electronic device 200. Here, the QoE state information per traffic may be configured as shown in Table 1 above. According to an embodiment, the secondary electronic device 202 may periodically acquire QoE state information and report the same to the primary electronic device 200. As another example, the secondary electronic device 202 may periodically monitor whether the QoE state information is changed, and may report the QoE state information to the primary electronic device 200 whenever a change in the QoE state information is detected.

Then, in step 705, the secondary electronic device 202 receives a parameter for differentiating traffic per period from the primary electronic device 200, and the process proceeds to step 707 to perform communication with the primary electronic device 200 based on the received parameter. According to an embodiment of the present invention, the secondary electronic device 202 may receive the MAC layer control parameter for differentiating traffic that use the period 1. For example, when medium access is performed according to the CSMA/CA wireless access technology, the MAC layer control parameter may include a parameter indicating a transmission opportunity for the corresponding traffic during a contention free period. As another example, when medium access is performed according to the CSMA/CA wireless access technology, the MAC layer control parameter may include a parameter indicating the media access probability for the corresponding traffic and/or the length of a time period (transmission opportunity (TXOP)) at which the medium may be independently used during a contention period. The secondary electronic device 202 may acquire, from the primary electronic device 200, the MAC layer control parameter for the corresponding traffic in the header 911 of the IP packet as shown in FIG. 9B. In addition, the secondary electronic device 202 may receive, from the primary electronic device 200, a separate message including the MAC layer control parameter for at least one part of traffic of the secondary electronic device 202. The secondary electronic device 202 may perform media access, as shown in FIG. 10, based on the acquired MAC layer control parameter.

According to various embodiments of the present invention, the secondary electronic device 202 may receive a transport layer control command or a transport layer control parameter for particular traffic in step 705. The secondary electronic device 202 may perform a TCP-or-UDP-based transmission control mechanism as described above to control the transport layer speed of the corresponding traffic, based on the transport layer control command or the transport layer control parameter. For example, the secondary electronic device 202 may decrease the transmission rate for the corresponding TCP traffic based on the transport layer control parameter by using a method, such as the increase of RTT of the TCP traffic, decrease of the RCVD value, indication of the ECN bit and the ECE bit, and the duplicated ACK transmission. In another example, the secondary electronic device 202 may increase the delay and/or packet loss value reported to the server 210 for UDP traffic, based on the transport layer control parameter, to be indicated as a value greater than the delay and/or packet loss value for the actual network conditions, so as to decrease the transmission rate for the corresponding UDP traffic. In another example, the secondary electronic device 202 may decrease the delay and/or packet loss value reported to the server 210 for UDP traffic, based on the transport layer control parameter, to be indicated as a value smaller than the delay and/or packet loss value for the actual network conditions, so as to increase the transmission rate for the corresponding UDP traffic.

Then, the secondary electronic device 202 terminates the procedure according to an embodiment of the present invention.

FIG. 10 is a diagram illustrating an example of performing MAC layer differentiation for traffic between a primary electronic device and a secondary electronic device according to an embodiment of the present invention. Here, the primary electronic device 200 is denoted as ME1 the secondary electronic device A 202-1 as ME2-A, and the secondary electronic device B 202-2 is denoted as ME2-B. In addition, here, two parts of traffic are present between the secondary electronic device A (ME2-A) and the primary electronic device ME1 and traffic having higher-priority among the two parts of traffic is denoted as ME2-A HP, and traffic having lower-priority is denoted as ME2-A LP. In addition, it is assumed that the sum of the priorities by traffic of the secondary electronic device A (ME2-A) is higher than the sum of the priorities by the at least one part of traffic of the secondary electronic device B (ME2-B), that is, the priority of the secondary electronic device A (ME2-A) is higher than the priority of the secondary electronic device B (ME2-B). In addition, it is assumed that ME2-A HP has the highest priority among traffic of the period 1 detected by the primary electronic device ME1.

As shown in FIG. 10, the primary electronic device 200 may schedule such that the secondary electronic device ME2-A having higher priority among the secondary electronic device A (ME2-A) and the secondary electronic device B (ME2-B) has more transmission opportunities in the CFP 1000 than the secondary electronic device B (ME2-B). Illustratively, the primary electronic device ME1 may determine a time period (to ME2-A HP, 1001 and 1002) indicating a transmit opportunity, by the primary electronic device ME1, to the secondary electronic device A (ME2-A) and a time period (from ME2-A HP, 1003 and 1004) indicating a transmit opportunity, by the secondary electronic device A (ME2-A), to the primary electronic device ME1 in CFP 1000, in order to transmit and receive ME2-A HP of the secondary electronic device A (ME2-A) having the highest priority in CFP 1000. Accordingly, the primary electronic device ME1 and the secondary electronic device A (ME2-A) may transmit and receive the packet for the corresponding traffic ME2-A HP based on the time periods 1001 to 1004 determined in the CFP 1000.

In addition, the primary electronic device 200 may schedule such that the secondary electronic device ME2-A having higher priority among the secondary electronic device A (ME2-A) and the secondary electronic device B (ME2-B) has more transmission opportunities in the CP 1010 than the secondary electronic device B (ME2-B). Illustratively, the primary electronics ME1 may determine the medium access probability and the TXOP length of the secondary electronic device A (ME2-A) having the highest priority in the CP 1010 as a value greater than the medium access probability and the TXOP length of the secondary electronic device B (ME2-B). Accordingly, the secondary electronic device A (ME2-A) may perform medium access more frequently than the secondary electronic device B (MEB-B) in the CP 1010. In addition, a time period (TXOP, 1011 and 1012) for which the secondary electronic device A (ME2-A) succeeds in medium access in the CP 1010 and maintains the medium access may be set longer than a time period (TXOP, 1013 and 1014) for which the secondary electronic device B (MEB-B) succeeds in medium access in the CP 1010 and maintains the medium access.

In addition, in the CP 1010, when each of the secondary electronic devices ME2-A and ME2-B succeeds in medium access, the primary electronic device 200 may schedule such that traffic supported by each of the secondary electronic devices ME2-A and ME2-B in the time period for maintaining the medium access may be differentially processed according to the priority. Illustratively, the primary electronics ME1 may frequently control the transmission periods (1021, 1022, 1023, and 1024) of ME2-A HP than the transmission periods (1025 and 1026) of ME2-A LP, so that the packet of traffic ME2-A HP having higher priority among traffic (ME2-A HP, ME2-A LP) of the secondary electronic device ME2-A in the transmission periods 1011 and 1020 from the primary electronic device ME1 to the secondary electronic device A (ME2-A) in the CP 1010 is more frequently transmitted than the packet of traffic ME2-A LP having lower priority.

Figure 11:
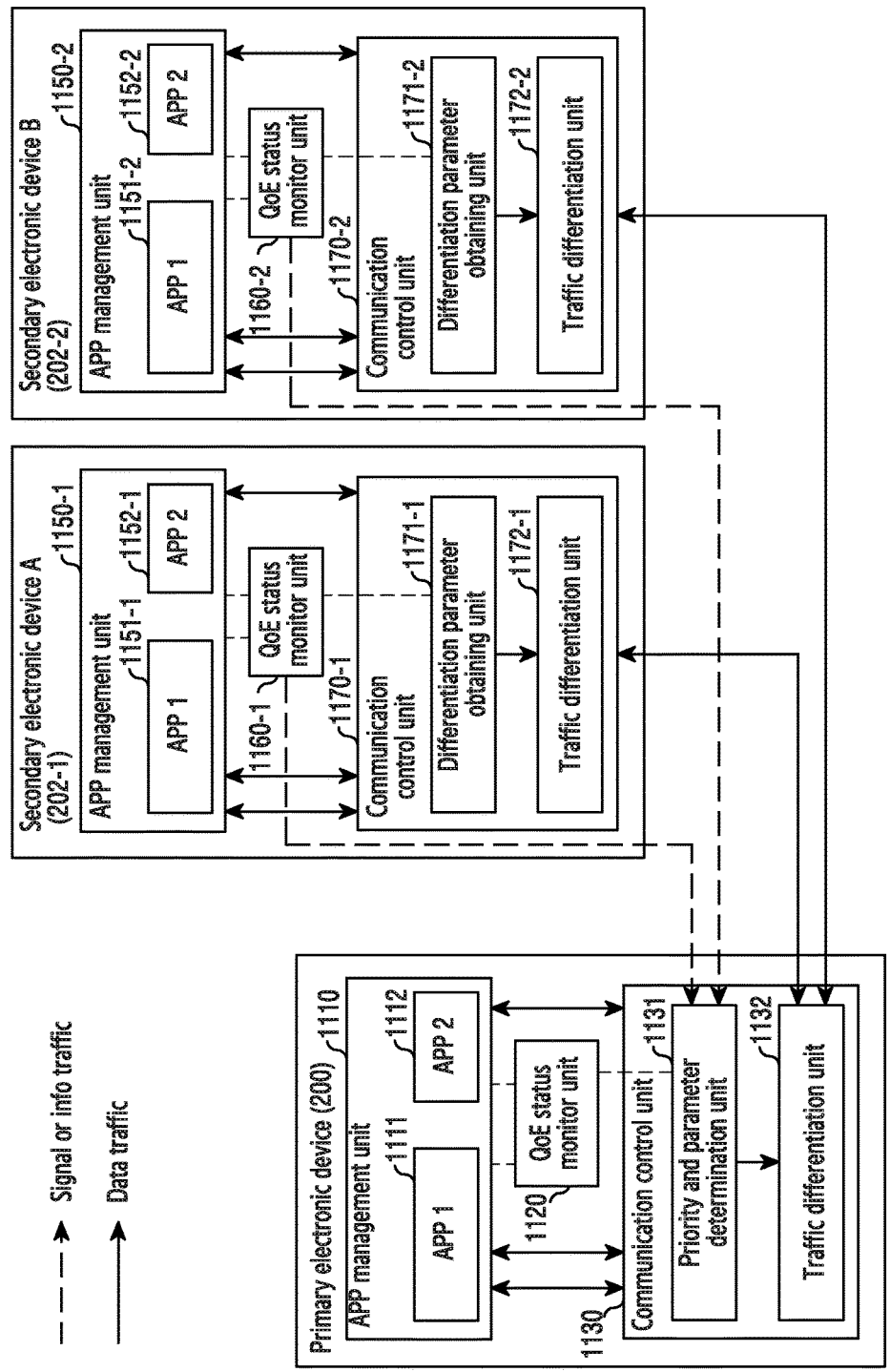
FIG. 11 is a diagram illustrating a block configuration of a primary electronic device and a secondary electronic device according to an embodiment of the present invention.

FIG. 11 is a diagram illustrating a block configuration of a primary electronic device and a secondary electronic device according to an embodiment of the present invention.

Referring to FIG. 11, the primary electronic device 200 includes an application (APP) management unit 1110, a QoE state monitor unit 1120, and a communication controller 1130. FIG. 11 illustrates only basic elements of the primary electronic device 200 for the convenience of explanation according to an embodiment of the present invention. However, the primary electronic device 200 according to an embodiment of the present invention may include other elements than the illustrated elements.

The application management unit 1110 includes a plurality of applications (e.g., APP1 1111 and APP2 1112), and performs a control operation for each application. For example, the application management unit 1110 executes and controls an application according to user control and system configuration. The application may include an application that requires communication with another electronic device and/or a server device.

The QoE state monitor unit 1120 monitors the application management unit 1110 and identifies an application that generates traffic among applications executed in the primary electronic device 200. The QoE state monitor unit 1120 monitors an application that generates traffic, and generates QoE state information per traffic according to the application as shown in Table 1. For example, the QoE state monitor unit 1120 may check an input device and an output device of the primary electronic device 200, which are associated with each application that generates traffic. In other words, the QoE state monitor unit 1120 monitors an input device that provides an input to each application that generates traffic and an output device that provides an output by each application that generates traffic, and generates device usage state information of an application as shown in Table 1. The QoE state monitor unit 1120 provides the QoE state information of the traffic according to the application to the communication controller 1130. Here, although not shown, the primary electronic device 200 may include various input devices and output devices. For example, the primary electronic device 200 may include an input device such as a microphone, a touch sensor, a keyboard, a health information sensor (e.g., a sensor for measuring electrocardiogram, pulse, respiration, etc.), a gyro sensor, a GPS, and the like, and an output device such as a display, a speaker, an earphone, a vibrating element, and the like.

The communication controller 1130 controls and processes functions for communication between the primary electronic device 200 and the secondary electronic devices 202-1 and 202-2, and for communication between the secondary electronic device 202 and the server 210. For example, the communication controller 1130 may connect and communicate with the secondary electronic devices 202-1 and 202-2 through a communication module (not shown) that supports a short-range wireless communication technology (e.g., Wi-Fi, Bluetooth (BT), near field communication (NFC), global positioning system (GPS), and the like, and may connect and communicate with the server 210 through a communication module (not shown) that supports a cellular mobile communication technology (e.g., LTE, LTE-A, CDMA, WCDMA, UMTS, WiBro, or GSM, etc.). The communication controller 1130 may transmit, to the cellular mobile communication network node 208 and/or the server 210, packets received from the secondary electronic devices 202-1 and 202-2 through the short-range wireless communication technology, and may transmit, to the secondary electronic devices 202-1 and 202-2, packets received from the cellular mobile communication network node 208 and/or the server 210. In particular, the communication controller 1130 according to an embodiment of the present invention controls the function for differentially processing all parts of traffic detected in the primary electronic device 200, for example, traffic corresponding to the secondary electronic devices 202-1 and 202-2, and traffic corresponding to the application being executed by the application management unit 1110 of the primary electronic device 200.

The communication controller 1130 includes a priority and parameter determination unit 1131 and a traffic differentiation unit 1132. The priority and parameter determination unit 1131 may collect QoE state information per traffic, and may determine a priority for each part of traffic based on the collected QoE parameter information as shown in Equation 1 described above. Here, the priority and parameter determination unit 1131 may acquire, from the QoE state monitor unit 1120, the QoE state information on the traffic of an application being executed in the primary electronic device 200, and may receive the QoE state information on traffic of each application from the secondary electronic devices 202-1 and 202-2. As another example, the priority and parameter determination unit 1131 may determine a priority for each part of traffic based on a priority per application which is predetermined through the user interface.

The priority and parameter determination unit 1131 determines parameters for traffic differentiation based on the priority determined for traffic. For example, the priority and parameter determination unit 1131 may determine a MAC layer control parameter and a transport layer control parameter for traffic corresponding to a period between the primary electronic device 200 and the secondary electronic devices 202-1 and 202-2, and may determine a transport layer parameter for traffic corresponding to a period between the primary electronic device 200 and the server 210.

The traffic differentiation unit 1132 may differentially process traffic for each period based on the parameters determined by the priority and parameter determination unit 1131. For example, the traffic differentiation unit 1132 may control traffic corresponding to the period between the primary electronic device 200 and the secondary electronic devices 202-1 and 202-2 so as to perform differentiated media access based on the MAC layer control parameters determined in the priority and parameter determination unit 1131. In another example, the traffic differentiation unit 1132 may control the traffic corresponding to the period between the primary electronic device 200 and the server so as to adjust the transmission rate based on the transport layer parameter determined by the priority and the parameter determination unit 1131. In order to perform traffic differentiation, the traffic differentiation unit 1132 may transmit, to the secondary electronic devices 202-1 and 202-2, the MAC layer control parameter and/or the transport layer control parameter determined by the priority and parameter determination unit 1131. For example, the traffic differentiation unit 1132 may add a MAC layer control parameter and/or a transport layer control parameter to a packet to be transmitted from the primary electronic device 200 to the secondary electronic devices 202-1 and 202-2, and may transmit the same to the secondary electronic devices 202-1 and 202-2. In another example, the traffic differentiation unit 1132 may generate a separate message including the MAC layer control parameter and/or the transport layer control parameter, and may transmit the same to the secondary electronic devices 202-1 and 202-2.

Next, each of the secondary electronic device A 202-1 and the secondary electronic device B 202-2 is configured to include application (APP) management units 1150-1 and 1150-2, QoE state monitor units 1160-1 and 1160-2, communication controllers 1170-1 and 1170-2. FIG. 11 illustrates only basic elements of the secondary electronic devices 202-1 and 202-2 for the convenience of explanation according to an embodiment of the present invention. However, the secondary electronic devices 202-1 and 202-2 according to an embodiment of the present invention may include other elements than the illustrated elements. Since the configurations of the secondary electronic devices 202-1 and 202-2 according to an embodiment of the present invention are the same, the secondary electronic device A 202-1 will be described below as an example.

The application management unit 1150-1 includes a plurality of applications (e.g., APP1 1151-1 and APP2 1151-2), and performs a control operation for each application. For example, the application management unit 1150-1 runs and controls applications according to user control and system configuration. The application may include an application that requires communication with other electronic device and/or a server device.

The QoE state monitor unit 1160-1 monitors the application management unit 1150-1 and identifies an application that generates traffic among applications that have executed in the secondary electronic device A 202-1. The QoE state monitor unit 1160-1 monitors an application that generates traffic, and generates QoE state information per traffic according to the application, as shown in Table 1. For example, the QoE state monitor unit 1160-1 may check an input device and an output device of the secondary electronic device A 202-1, which are associated with each application that generates traffic. In other words, the QoE state monitor unit 1160-1 monitors an input device that provides an input to each application that generates traffic and an output device that provides an output by each application that generates traffic, and generates device usage state information of an application as shown in Table 1. The QoE state monitor unit 1160-1 provides the QoE state information of the traffic according to the application to the communication controller 1130. Here, although not shown, the secondary electronic device A (202-1) may include various input devices and output devices. For example, the secondary electronic device A (202-1) may include an input device, such as a microphone, a touch sensor, a keyboard, a health information sensor (e.g., a sensor for measuring electrocardiogram, pulse, respiration, etc.), a gyro sensor, and a GPS, and the like, and an output device such as a display, a speaker, an earphone, a vibrating element, and the like.

The communication controller 1170-1 controls and processes a function for communication between the primary electronic device 200 and the secondary electronic device A 202-1. For example, the communication controller 1170-1 may connect and communicate with the primary electronic device 200 through a communication module (not shown) that supports a short-range wireless communication technology (e.g., Wi-Fi, Bluetooth (BT), Near Field Communication (NFC), global positioning system (GPS), and the like). The communication controller 1170-1 may communicate with the cellular mobile communication network node 208 and/or the server 210 through the primary electronic device 200. Particularly, the communication controller 1170-1 according to an embodiment of the present invention may perform a function for transmitting, to the primary electronic device 200, the QoE state information for traffic transmitted from the secondary electronic device A 202-1 to the primary electronic device 200 and traffic transmitted from the secondary electronic device A 202-1 through the primary electronic device 200 to the cellular mobile communication network node 208 and/or the server 210.

In addition, the communication controller 1170-1 includes a differentiation parameter acquisition unit 1171-1 and a traffic differentiation unit 1172-1. The differentiation parameter acquisition unit 1171-1 processes a function for receiving a parameter for traffic differentiation from the primary electronic device 200. In addition, the traffic differentiation unit 1172-1 controls and processes a function for differentially processing traffic according to the application executed in the secondary electronic device A (202-1) according to the received differentiation parameter. For example, the differentiation parameter acquisition unit 1171-1 may receive, from the primary electronic device 200, a MAC layer control parameter for each part of traffic according to an application executed in the secondary electronic device A 202-1. In addition, the traffic differentiation unit 1172-1 may perform differentiated medium access for each part of traffic based on the MAC layer control parameter, as shown in FIG. 10. In another example, the differentiation parameter acquisition unit 1171-1 may receive, from the primary electronic device 200, a transport layer control parameter for at least one part of traffic according to an application executed in the secondary electronic device A 202-1. In addition, the traffic differentiation unit 1172-1 may control the transport layer speed for the particular traffic based on the transport layer control parameter for the particular traffic. For example, the traffic differentiation unit 1172-1 may decrease the transmission rate for the corresponding TCP traffic by using a method, such as, the increase of RTT of the TCP traffic, decrease of the RCVD value, indication of the ECN bit and the ECE bit, and the duplicated ACK transmission based on the transport layer control parameter. In another example, the traffic differentiation unit 1172-1 may increase the delay and/or packet loss value reported to the server 210 for UDP traffic, based on the transport layer control parameter, to be indicated as a value greater than the delay and/or packet loss value for the actual network conditions, so as to decrease the transmission rate for the corresponding UDP traffic. In another example, the traffic differentiation unit 1172-1 may decrease the delay and/or packet loss value reported to the server 210 for UDP traffic, based on the transport layer control parameter, to be indicated as a value smaller than the delay and/or packet loss value for the actual network conditions, so as to increase the transmission rate for the corresponding UDP traffic.

In FIG. 11 described above, the application management unit, the QoE state monitor unit, and the communication controller are described as separate elements, however, according to another embodiment, the application management unit, the QoE state monitor unit, and the communication controller may be configured as one element. For example, functions of the application management unit, the QoE state monitor unit, and the communication controller may be performed by one controller.

As described above, an embodiment of the present invention has described a method and device for enhancing the quality of experience (QoE) of a user by differentially controlling application traffic of a primary electronic device and a secondary electronic device in a system where the secondary electronic device is provided with a communication service through the primary electronic device.

In an embodiment of the present invention described above, the QoE state information in Table 1 is an example, and embodiments of the present invention are not limited to the QoE state information in Table 1. For example, when an embodiment of the present invention is applied to a vehicle system, the QoE state information may be configured as shown in Table 2 below. For example, in the case of a vehicle system, a primary electronic device may be a smart phone of a user capable of accessing the Internet through a cellular mobile communication network and capable of communicating with a secondary electronic device through a short-range wireless communication, and the secondary electronic device may be in-vehicle devices (e.g., Infotainment system, audio device, video device, navigation device, check sensor, black box, and hands-free calling device, etc.) that support a short range wireless communication technology.

TABLE 2

| Items | Contents | Values |
| --- | --- | --- |
| Differentiation (prioritization) request flag | Indicates that QoE state information is included. That is, indicates whether QoE state information is included in header information of the packet | 0/1 (0: QoE state information is not included, 1: QoE state information is included) |
| Application ID | Indicates identification information for identifying an application corresponding to traffic in a secondary electronic device | A value assigned randomly, as a value that is unique in an electronic device |
| Device type | Indicates device type of a secondary electronic device corresponding to the corresponding traffic | Audio/Video, Hands-free calling device, Vehicle sensor, Black box, Traffic information measuring device, Navigation device |
| Traffic urgency | Indicates the urgency of the corresponding traffic. | Urgent, real time, active, best effort |
| Required bandwidth | Indicates the bandwidth required when the corresponding traffic is real-time or multimedia transmission | A value determined by an application |
| Required latency | Indicates the latency required to guarantee when the corresponding traffic is real-time or multimedia transmission | A value determined by an application |

As shown in Table 2, when an embodiment of the present invention is applied to a vehicle system, the QoE information may include a differentiation request flag, an application ID, a device type, traffic urgency, a required bandwidth, and a required latency. Here, the differentiation request flag, the application ID, the required bandwidth, and the required latency are the same as the QoE information in Table 1, and a description thereof will be omitted. On the other hand, the device type indicates a device type of the secondary electronic device for the corresponding traffic, and it may indicate that the device type of the secondary electronic device corresponds to one of various device types such as audio/video, hands-free call, vehicle sensor, black box, traffic information measurement device, and navigation device, and the like. Here, the listed device types are illustrative and not limited thereto, and may include other device types. In addition, the traffic urgency may indicate the urgency of the corresponding traffic, and in an embodiment of the present invention, the traffic urgency may be divided into four steps of Urgent, Real time, Active, and Best effort. For example, the secondary electronic device may indicate that the urgency of traffic for a failure detection signal of a vehicle should be set to "Urgent", and the same is preferentially processed than other traffic. In another example, the secondary electronic device may set the urgency of traffic for voice call or navigation information to "Real time", so that the corresponding traffic should be processed at a lower priority than the traffic having "Urgent". In another example, the secondary electronic device may set the urgency of traffic for listening to music to "Active", so that the traffic should be processed at a lower priority than the traffic having the "Urgent" or "Real time". In another example, the secondary electronic device may set the urgency of traffic for application updates or black box storage to "Best effort", so that the traffic should be processed at a lower priority than the traffic having the "Urgent", "Real time" or "Active".

In another example, when an embodiment of the present invention is applied to a home network system, the QoE state information may be configured as shown in Table 3 below. For example, in the case of a home network system, the primary electronic device may be an apparatus that can access the Internet through a cellular mobile communication network or a wired network, and can communicate with the secondary electronic device through a short-range wireless communication. In addition, the secondary electronic device may be in-home electronic products (e.g., a refrigerator, a washing machine, an audio, a CCTV, a vacuum cleaner, a temperature control sensor, an air conditioner, a fire alarm apparatus, etc.) that support a short-range wireless communication technology.

TABLE 3

| Items | Contents | Values |
| --- | --- | --- |
| Differentiation (prioritization)request flag | Indicates that QoE state information is included. That is, indicates whether QoE state information is included in header information of the corresponding packet | 0/1 (0: QoE state information is not included, 1: QoE state information is included) |
| Application ID | Indicates identification information for identifying an application corresponding to the corresponding traffic in a secondary electronic device | A value assigned randomly, as a value that is unique in an electronic device |
| Device type | Indicates device type of a secondary electronic device corresponding to the corresponding traffic | Refrigerator. washing machine, audio. CCTV, vacuum cleaner, temperature control sensor, air conditioner, fire alarm apparatus, etc. |
| Traffic urgency | Indicates the urgency of the corresponding traffic | Urgent, real time, active, best effort |
| Required bandwidth | Indicates the bandwidth required if the corresponding traffic is real-time or multimedia transmission. | A value determined by an application |
| Required latency | Indicates the latency required to guarantee if the corresponding traffic is real-time or multimedia transmission | A value determined by an application |

As shown in Table 2, when an embodiment of the present invention is applied to a home network system, the QoE information may include a differentiation request flag, an application ID, a device type, traffic urgency, a required bandwidth, and a required latency. Here, the differentiation request flag, the application ID, the required bandwidth, and the required latency are the same as the QoE information in Table 1, and a description thereof will be omitted. On the other hand, the device type indicates a device type of the secondary electronic device for the corresponding traffic, and it may indicate that the device type of the secondary electronic device corresponds to one of various device types, such as a refrigerator, a washing machine, an audio, a CCTV, a vacuum cleaner, a temperature control sensor, an air conditioner, a fire alarm apparatus, and the like. Here, the listed device types are illustrative and not limited thereto, and may include other device types. In addition, the traffic urgency may indicate the urgency of the corresponding traffic, and in an embodiment of the present invention, the traffic urgency may be divided into four steps of Urgent, Real time, Active, and Best effort. For example, the secondary electronic device may set the urgency of traffic for a signal indicating an emergency (e.g., a fire occurrence signal, an intrusion alert signal) to "Urgent", so that the traffic should be preferentially processed over other traffic. In another example, the secondary electronic device may set the urgency of traffic for CCTV, listening to music, or watching VOD to "Real time", so that the traffic should be processed with a lower priority than the traffic having "Urgent". In another example, the secondary electronic device may set the urgency of traffic for listening to music to "Active", so that the traffic should be processed at a lower priority than the traffic having the "Urgent" or "Real time". In another example, the secondary electronic device may set the urgency of traffic for application updates to "Best effort", so that the traffic should be processed at a lower priority than other parts of traffic having the "Urgent", "Real time" or "Active".

Although the present invention has been described by the restricted embodiments and the drawings as described above, the present invention is not limited to the aforementioned embodiments and various modifications and alterations can be made from the descriptions by those skilled in the art to which the present invention pertains.

The operations according to embodiments of the present invention may be implemented by a single controller. In this case, program instructions for performing various computer-implemented operations may be stored in a computer-readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When all or some of the base stations or relays as described in the present invention are implemented by a computer program, a computer-readable recording medium in which the computer program is stored also falls within the scope of the present invention. Therefore, the scope of the present invention should not be defined as being limited to the embodiments, but should be defined by the appended claims and equivalents thereof.

The invention claimed is:

1. A method for operating an electronic device, the method comprising:
   identifying traffic corresponding to at least one application associated with a server and another electronic device;
   determining a priority of the traffic for each of a first path and a second path based on application related information;
   determining a first parameter of the first path based on the priority of the traffic for the first path, and a second parameter of the second path based on the priority of the traffic for the second path; and transmitting downlink packet based on the first parameter for the first path, and uplink packet based on the second parameter for the second path, wherein the first path is a path between the electronic device and the another electronic device, and wherein the second path is a path between the electronic device and the server.

2. The method of claim 1,
wherein the method further comprises:
acquiring the application related information on traffic corresponding to the at least one application;
controlling at least one of the medium access probability, medium access time, packet transfer rate, or a quality of service (QoS) of a bearer, for the traffic, based on the priorities for the traffic, and
wherein the priority is determined using at least one of equation or a user input based on the acquired application related information.

3. The method of claim 2, wherein the controlling of at least one of the medium access probability, the medium access time, the packet transfer rate, or the quality of service (QoS) of the bearer, for the traffic, based on the priorities for the traffic comprises:
determining a parameter for a media access control (MAC) layer control based on the priority of the first path for the identified traffic; and
controlling at least one of the probability of the medium access or the medium access time for the identified traffic in the first path based on the determined parameter.

4. The method of claim 2, wherein controlling of at least one of the medium access probability, the medium access time, the packet transfer rate, or the quality of service (QoS) of the bearer, for the traffic, based on the priorities for the traffic comprises:
determining a parameter for a transport layer control based on the priority of the second path for the identified traffic; and
controlling the transmission rate for the identified traffic in the second path based on the determined parameter.

5. The method of claim 1, wherein the method further comprises:
identifying traffic using a third path between the electronic device and a network node;
determining a quality of service (QoS) required by the identified traffic based on the application related information;
determining whether a change in the QoS of the bearer corresponding to the identified traffic is required based on the QoS required by the identified traffic; and
when the change in the QoS of the bearer corresponding to the identified traffic is required, making a request for changing the QoS of the bearer to the network node.

6. The method of claim 2, wherein the traffic corresponding to the at least one application comprises at least one traffic corresponding to an application executed in the electronic device and at least one traffic corresponding to an application of at least one other electronic device connected to the electronic device.

7. The method of claim 6,
wherein acquiring of the application related information on the traffic comprises:
receiving a packet for at least one traffic from other electronic device connected to the electronic device; and acquiring the application related information from a header of the received packet, and wherein the application related information comprises at least one of an application identifier, an application type, the state of using input and output devices by the application, a required bandwidth, a required delay time, a device type, or the urgency of the corresponding traffic.

8. An electronic device comprising:
a transceiver configured to communicate with another electronic device; and
a at least one processor configured to:
identify traffic corresponding to at least one application associated with a server and another electronic device;
determine a priority of the traffic for each of a first path and a second path based on application related information;
determine a first parameter of the first path based on the priority of the traffic for the first path, and a second parameter of the second path based on the priority of the traffic for the second path; and
transmit downlink packet based on the first parameter for the first path, and uplink packet based on the second parameter for the second path,
wherein the first path is a path between the electronic device and the another electronic device, and
wherein the second path is a path between the electronic device and the server.

9. An electronic device comprising:
a transceiver configured to communicate with another electronic device; and
at least one processor configured to:
identify traffic corresponding to at least one application associated with a server and another electronic device,
transmit application related information on the traffic to another electronic device connected to the electronic device, and
receive a downlink packet based on a first parameter for a first path,
wherein the first path is a path between the electronic device and the another electronic device,
wherein the first parameter is determined based on a priority for the first path, and
wherein the priority for the first path is determined based on application related information.

10. The electronic device of claim 8,
wherein the at least one processor is configured to:
acquire the application related information on the traffic corresponding to the at least one application, and
control at least one of the medium access probability, medium access time, packet transfer rate, or a quality of service (QoS) of a bearer, for the traffic, based on the priorities for the traffic, and
wherein the priority is determined using at least one of equation or a user input based on the acquired application related information.

11. The electronic device of claim 10, wherein the at least one processor is configured to:
determine a parameter for a media access control (MAC) layer control based on the priority of the first path for the identified traffic, and
control at least one of the probability of the medium access or the medium access time for the identified traffic in the first path based on the determined parameter.

12. The electronic device of claim 10, wherein the at least one processor is configured to:
   determine a parameter for a transport layer control based on the priority of the second path for the identified traffic, and
   control the transmission rate for the identified traffic in the second path based on the determined parameter.

13. The electronic device of claim 8, wherein the at least one processor is configured to:
   identify traffic using a third path between the electronic device and a network node,
   determine a quality of service (QoS) required by the identified traffic based on the application related information,
   determine whether a change in the QoS of the bearer corresponding to the identified traffic is required based on the QoS required by the identified traffic, and
   when the change in the QoS of the bearer corresponding to the identified traffic is required, making a request for changing the QoS of the bearer to the network node.

14. The electronic device of claim 10, wherein the traffic corresponding to the at least one application comprises at least one traffic corresponding to an application executed in the electronic device and at least one traffic corresponding to an application of at least one other electronic device connected to the electronic device.

15. The electronic device of claim 14,
   wherein the transceiver is configured to receive a packet for at least one traffic from other electronic device connected to the electronic device,
   wherein the at least one processor is configured to acquire the application related information from a header of the received packet, and
   wherein the application related information comprises at least one of an application identifier, an application type, the state of using input and output devices by the application, a required bandwidth, a required delay time, a device type, or the urgency of the at least one traffic.

16. The electronic device of claim 9, wherein the first parameter comprises at least one of the medium access probability, medium access time, or transmission rate for the traffic.

17. The electronic device of claim 9,
   wherein the at least one processor is configured to transmit the application related information to the other electronic device by comprising the same in a header of a packet for the detected at least one traffic, and
   wherein the application related information comprises at least one of an application identifier, an application type, state of using input and output devices by the application, a required bandwidth, a required delay time, a device type, or the urgency of the corresponding traffic.

* * * * *